(12) United States Patent
Jannink et al.

(10) Patent No.: US 8,631,068 B1
(45) Date of Patent: Jan. 14, 2014

(54) PEER-BASED COMMUNICATIONS SYSTEM WITH SCALABLE DATA MODEL

(75) Inventors: Jan F. Jannink, Menlo Park, CA (US); Dalton M. Caldwell, Mountain View, CA (US)

(73) Assignee: Myspace Music LLC, Beverly Hills, CA (US)

( * ) Notice: Subject to any disclaimer, the term of this patent is extended or adjusted under 35 U.S.C. 154(b) by 1181 days.

(21) Appl. No.: 11/500,543

(22) Filed: Aug. 8, 2006

Related U.S. Application Data

(60) Provisional application No. 60/707,894, filed on Aug. 11, 2005.

(51) Int. Cl.
*G06F 15/16* (2006.01)
(52) U.S. Cl.
USPC .......................................................... 709/204
(58) Field of Classification Search
USPC .......................................................... 709/204
See application file for complete search history.

(56) References Cited

U.S. PATENT DOCUMENTS

| | | | | |
|---|---|---|---|---|
| 5,963,951 | A * | 10/1999 | Collins | 1/1 |
| 6,175,831 | B1 | 1/2001 | Weinreich | |
| 2002/0099714 | A1 * | 7/2002 | Murray | 707/100 |
| 2004/0181540 | A1 * | 9/2004 | Jung et al. | 707/100 |

OTHER PUBLICATIONS

"File Sharing: Napster and derivatives," pp. 1-8, notes for CS109 lecture 15, Princeton University Computer Science Dept. Printed from Internet at http://www.cs.princeton.edu/courses/archive/fall2003/cs109/lecture15.pdf (2003).
"The Gnutella Protocol Specification v0.4" (Document Revision 1.2) (10 pages) Printed from Internet at http://www9.limewire.com/developer/gnutella_protocol_0.4.pdf on Jun. 1, 2004.
"The FastTrack Protocol" v. 1.18 (Apr. 14, 2004) pp. 1-17 Printed from Internet at http://cvs.berlios.de/cgi-bin/viewcvs.cgi/gift-fasttrack/giFT-FastTrack/Protocol?rev=1.18.
Aitken et al. "Peer-to-Peer Technologies and Protocols" pp. 1-11 Printed from Internet at http://ntrg.cs.tcd.ie/undergrad/4ba2.02/p2p/.
"Google Answers: How does KaZaA/FastTrack work?" (2002) (3 pages) Printed from Internet at http://answers.google.com/answers/threadview?id=35225.

* cited by examiner

*Primary Examiner* — Ashok Patel
*Assistant Examiner* — Lawrence Cosby
(74) *Attorney, Agent, or Firm* — Gates & Cooper LLP

(57) ABSTRACT

A peer-based communications service is provided in which linking relationships between members and topics of interest and the properties of members and topics of interest are represented by links in a links table. Each row in the links table corresponds to a link. Each row contains an association portion and a descriptive attribute portion. Link associations are used to associate member and topic objects to each other and are used to associate a member or topic with a property of that member or topic. The descriptive attributes include privacy settings that are used to restrict access to content in the service. Members may be related to each other as friends, friends of friends, or through other relationships. The privacy settings may be used to restrict viewing of links and properties to appropriate members.

10 Claims, 30 Drawing Sheets

| association | | descriptive attributes | | | | |
|---|---|---|---|---|---|---|
| object id | target id | privacy | type | score/rank | label | content | authenticity |
| 100,001 | 10,000 | | 1 | | | John | |
| 100,001 | 100,002 | | 2 | | | Pen pal | |
| 100,001 | 98 | | 3 | | | Cool gear | |
| 100,001 | 99 | | 3 | | | My club | |
| 100,002 | 10,000 | | 1 | | | Bill | |
| 100,002 | 100,001 | | 2 | | | Buddy | |
| 100,002 | 100,003 | | 2 | | | Sister | |
| 100,003 | 10,000 | | 1 | | | Lisa | |
| 100,003 | 100,002 | | 2 | | | Brother | |
| 96 | 10,000 | | 4 | | | Dell | |
| 97 | 10,000 | | 4 | | | IBM | |
| 97 | 96 | | 5 | | | Rival | |
| 98 | 10,000 | | 4 | | | Computers | |
| 98 | 97 | | 6 | | | Vendor | |
| 99 | 10,000 | | 4 | | | PC club | |
| 99 | 100,001 | | 7 | | | President | |
| 99 | 100,002 | | 8 | | | Hacker | |

| object id | target id | privacy | type | score/rank | label | content | authenticity |
|---|---|---|---|---|---|---|---|
| 100,001 | 10,000 | 3 | 1 | | | John | |
| 100,001 | 100,002 | 3 | 2 | | | Pen pal | |
| 100,001 | 98 | 0 | 3 | | | Cool gear | |
| 100,001 | 99 | 1 | 3 | | | My club | |
| 100,002 | 10,000 | 3 | 1 | | | Bill | |
| 100,002 | 100,001 | 3 | 2 | | | Buddy | |
| 100,002 | 100,003 | 3 | 2 | | | Sister | |
| 100,003 | 10,000 | 3 | 1 | | | Lisa | |
| 100,003 | 100,002 | 3 | 2 | | | Brother | |
| 96 | 10,000 | 3 | 4 | | | Dell | |
| 97 | 10,000 | 3 | 4 | | | IBM | |
| 97 | 96 | 3 | 5 | | | Rival | |
| 98 | 10,000 | 3 | 4 | | | Computers | |
| 98 | 97 | 3 | 6 | | | Vendor | |
| 99 | 10,000 | 1 | 4 | | | PC club | |
| 99 | 100,001 | 1 | 7 | | | President | |
| 99 | 100,002 | 1 | 8 | | | Hacker | | no link target no casual linking casual links only link by invitation only backlink by request auto-backlink

PEER-BASED COMMUNICATIONS SYSTEM WITH SCALABLE DATA MODEL

This patent application claims the benefit of provisional patent application No. 60/707,894, filed Aug. 11, 2005, which is hereby incorporated by reference herein in its entirety.

BACKGROUND OF THE INVENTION

The present invention relates to peer-to-peer communications services, and more particularly, to data models for supporting peer-to-peer services.

Peer-to-peer networks are formed by linking peer nodes to each other directly. Peer-to-peer networking architectures have been used for media-intensive services such as file sharing services. The peer nodes in such services are generally anonymous and are not capable of supporting an on-line community.

Most on-line communities are formed using server-based software applications. For example, server-based systems are available that allow users to register with a service and to share information about themselves with fellow users of the service. This type of arrangement is typically based on a central database that stores information for each of the participating users.

The use of peer-based communications systems for forming on-line communities holds the potential of being rapidly extensible to large numbers of users and more robust than conventional server-based arrangements. However, a suitable database system is required to support peer-based on-line communities.

Graph-based data models dominated early database systems. With this type of approach, pointers were used to explicitly link data items together.

Because of the inefficiencies associated with chasing links and detecting loops, graph-based databases were largely supplanted by relational database models in the 1980s. In relational databases, data is stored in a variety of tables. Database commands are used to retrieve data from the tables and to process the retrieved data to perform desired functions.

Relational databases generally have a small number of data types and relatively few links need to be formed between data types. As a result, it is usually practical to customize relational database software to optimize performance. For example, a particular look-up query may be hard coded, so that the data in certain tables can be accessed and processed efficiently. It is difficult, however, to use relational data model to capture web-type data effectively.

The development of object oriented programming languages led to the introduction of object-oriented databases in which data linkages were expressed explicitly by an object schema. Object relational databases attempt to capture some of the advantages of both relational and object oriented models and provide schema-based linkages between relational data. Object oriented data models are not entirely suitable for use in peer-based communications systems, because object oriented data models impose a distinction between the representation of data and the relationships between data items that can make these data models inefficient.

Semi-structured data models flourished in the 1990s with the development of hypertext markup language (HTML) and the world wide web and the introduction of extensible markup language (XML) architectures. Web browsers are not, however, capable of executing database operations such as filtering by content, performing operations on content, selectively retrieving data, etc.

It is an object of the present invention to provide a data model suitable for supporting peer-to-peer communications services such as those having many different types of data and large numbers of links between data items.

SUMMARY OF THE INVENTION

The present invention relates to peer-based communications systems in which members of a service communicate with each other about topics of interest. Each member is associated with computing equipment such as a personal computer. The computing equipment of the members is networked together using a network such as the internet. The members' computing equipment communicates with a server that implements global functions for the service. Each member uses a client to view information in the service. The client for a given member displays icons corresponding to the members and topics in the service. The given member can click on the icons to browse through the members and topics that are visible to the given client. Members can use privacy settings in the service to restrict the visibility of content.

Members and topics may be represented by objects. Linking relationships between objects are referred to as object links. Members and topics have properties. For example, the name of a member is a property of that member. The title of a topic is a property of that topic. Member and topic properties are represented as property links in the communications service.

Object links and property links are stored in a links table. Each row in the table represents a link. Each row contains an association portion and a descriptive attributes portion.

The association portion of each object link associates one object with another. Objects are represented by object identifiers, so each object link association contains two object identifiers, one for the linking object and one for the object at which the link terminates. The descriptive attribute portion of each object link contains information describing the characteristics of the relationship between the two linked objects.

The association portion of a property link contains an object identifier for a given object and a target identifier. In a directional graph representation of the property link, the link is depicted as a link pointing from the given object to the empty set. The descriptive attribute portion of the property link contains information on the given object's properties (e.g., the name associated with a member object).

Members may be linked to other members with various degrees of friendship. Members sharing direct bidirectional links are called friends. If two members are linked by virtue of a shared friend, these members are friends of friends. Other members are more remotely related.

The descriptive attribute portion of the links contains privacy settings. If certain content is given a restrictive privacy setting, it may only be visible to the member that created the content. Less restrictive privacy settings may be used to grant access to friends, to friends of friends, etc.

The service may maintain a global links table on the server. Each client may maintain a respective local subset of the global links table. Clients can synchronize their local subset to the global links table at login. During synchronization, the server may using privacy settings information to enforce member permissions. Each member is provided with links table information for which client access by that member is permitted.

When searching through the system or browsing for content of interest, the service allows members to view only that information permitted by the privacy settings. This allows members to create private topics and private links or to make content more freely available (e.g., to friends of friends, to all members of the communications service, or to the public).

The links table data model is efficient and readily scalable. Both linking associations and object properties are stored in the same table, so the same indexing scheme that is used to define the links between objects is also used to provide lookup capabilities for the properties associated with the objects.

BRIEF DESCRIPTION OF THE DRAWINGS

FIG. 8 shows a links table partially filled with illustrative entries in accordance with the present invention.

DETAILED DESCRIPTION OF THE PREFERRED EMBODIMENTS

Figure 1:
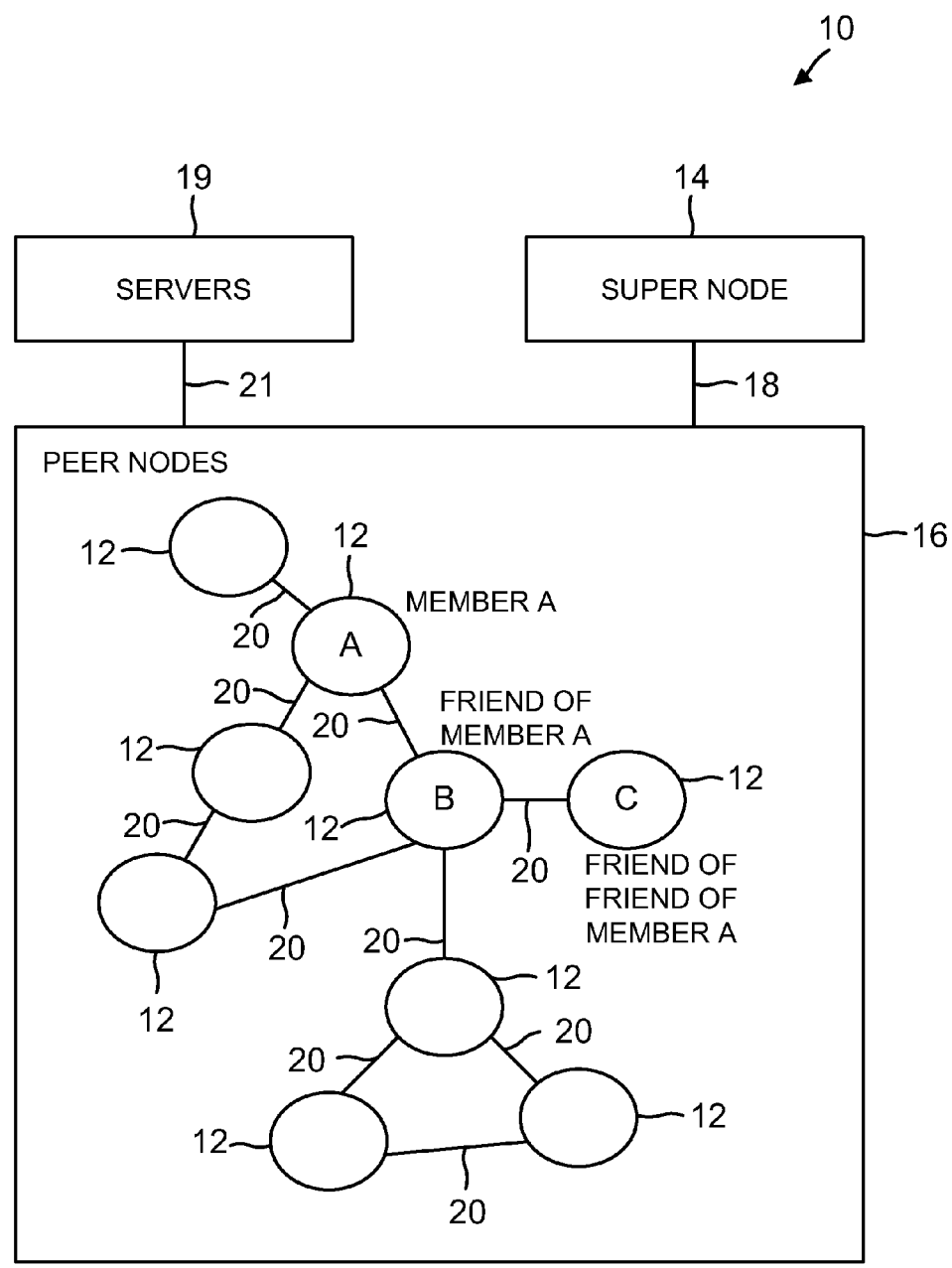
FIG. 1 is a diagram of an illustrative system for a peer-based communications service in which members at peer nodes communicate with each other about topics of interest using peer-based clients in accordance with the present invention.

The present invention relates to a service that allows members to share content and communicate with each other about topics of mutual interest. The service of the present invention is based on a peer-to-peer network architecture and is sometimes referred to as being "peer-based."

Information on the relationships between members and topics in the service and attributes of members and topics is stored in links tables. The links table architecture handles data and relationships in the service efficiently enough to support essentially infinite numbers of members and types of content. Scalability is maximized by treating linkable and non-linkable information in a uniform manner.

Members of the service can search and browse for content in the service. Privacy settings are stored in the links tables. The privacy settings are used to control which content is accessible to each member of the service. If desired, for example, some content may be made private, so that it may be viewed by its creator only. Other content may be made more public, so that it may be accessed by all members of the service.

Services that allow users to develop on-line relationships and to participate in on-line communications are sometimes referred to as "social networking services." The systems and methods of the present invention may be used to support the operation of a social networking service or any other type of communications service involving a network of users in a peer-based environment.

With the peer-based architecture of the present invention, members at peer nodes communicate with one another using instant messaging, real-time chat, blogs, and file sharing services. Peer nodes may, for example, be personal computers connected to the internet. A server node, called a supernode, is used to perform global functions such as authenticating members who are logging into the service and serves as a repository of global database information. Most content for the service is stored locally in local databases on the equipment of the members of the service and can be exchanged in a peer-to-peer fashion. This arrangement helps to avoid overburdening the supernode.

Members store pictures and other media on their computers. Members search for shared pictures and other media on the computers of other members using distributed database searches. Each member has a local database formed using a local links table. During distributed database searches, the local links tables of the members are searched. Members may also browse the local links tables of other members to access content of interest. In general, the supernode only needs to be consulted as a backup in the event that certain peers are not online and during synchronization operations. Once shared content has been located, it is transferred between peers without passing through a centralized repository.

Communications functions in the service may be supported using any suitable protocols. For example, interactive communications sessions between members can be initiated using the Session Initiation Protocol (SIP). Protocols such as Voice Over Internet Protocol (VOIP) may be used to support audio communications. Video (which includes audio) may be encoded using formats such as MPEG, QuickTime, and Windows Media. Using protocols such as these, members create links to other members and to topics of interest. Instant messaging communications are sent between members. Members chat about topics of mutual interest. Members also create and edit blogs and access the blogs of the other members.

Members have associated member profile information (e.g., name and address information, information on likes and dislikes, etc.). Topics have associated topic profiles. Member and topic profile information is stored in the local databases of members and at the supernode.

An illustrative system 10 for supporting a service in accordance with the present invention is shown in FIG. 1. As shown in FIG. 1, system 10 has multiple peer nodes 12 and a supernode 14. Each node 12 is typically associated with a member of the service. Nodes 12 are generally based on personal computers or other computing equipment. Nodes 12 communicate over a communications network such as the internet. Supernode 14 is a server or other suitable computing equipment. Servers in system 10 are made up of one or more computers and may be distributed or localized in their implementation. System 10 is described in the context of a single supernode 14 for clarity, but system 10 may have one or more supernodes such as supernode 14 and each supernode 14 may be implemented using any suitable number of servers.

The peer nodes in system 10 are active or inactive. Nodes are active when a given member has logged into the service and is online. Nodes are inactive when a member has disconnected the node from the network or has turned off the computer at that node.

When logging on to the service, a member contacts the supernode. The supernode authenticates the member and checks whether the given member's databases are up to date. For example, the supernode determines whether topic profile information and member profile information associated with the member is current. If an update is needed, the supernode synchronizes with the member's client to update the given member's databases. As shown schematically by box 16 and link 18 in FIG. 1, each node 12 is generally able to connect to supernode 14 (e.g., over an internet link). Each node is also generally able to connect to other servers 19. Servers 19 may be third party servers associated with online merchants, etc. Servers 19, supernode 14, and peer nodes 16 are interconnected by internet communications paths or other suitable communications paths. Communications paths for interconnecting peer nodes 16 and servers 19 are represented by line 21 in FIG. 1.

In a typical scenario, a member at one node desires to search for shared files or other content on other peer nodes. A distributed database searching technique is used to search other peers in the network. Each peer node has a local database containing information on that peer node and containing information on other peer nodes in the network. The local database is implemented using a local links table. During the distributed database search, the search being performed propagates from an originating node through other peer nodes in the network. As the local databases associated with the other peer nodes in the network are searched, search results are returned to the originating node.

Because the local databases of the peer nodes 12 are searched by propagating a search outward from a given node to other nodes in the system, the supernode 14 is not involved in a typical database search. If, however, a member of the service is unable to connect to other active nodes in the service, the supernode can be used to form a pathway into the active nodes of the service, so that the member can perform a search.

The nodes in system 10 are connected by links, shown schematically as links 20 in FIG. 1. When a member is interested in another member or a topic, the member can create an appropriate link. A member can also ask another member to create a backlink, thereby creating a bidirectional set of links. Bidirectional links are indicative of friendship relationships between members and are sometimes referred to as friendship links.

Because the pattern of links between the nodes in the system is determined by interests and friendships, there is generally no relationship between the links formed in the system and the physical network connections in the internet. For example, a service member A at one peer node may be linked to a service member B at another peer node by a friendship link 20, as shown in FIG. 1, even if the computer at member A's node and the computer at member B's node are physically far apart (e.g., in different states or countries).

The distances between peer nodes are generally referred to in terms of friendship relationships and node distances. As an example, consider the situation of FIG. 1. Member B is a friend of member A, as shown by the link joining the nodes of member A and member B. The node distance to the peer nodes that are friends of a given node is one. The node distance between the nodes of members A and B is therefore one. Member C is a friend of member B, as shown by the link joining the nodes of members B and C. Because member C is a friend of member B, member C is a friend-of-friend with respect to member A. The node distance between member A and member C is therefore two. The same structure holds for more distant nodes. Each additional link between peer nodes adds to the total node distance and adds one more level of remoteness in the friendship relationship.

Unlike peer-to-peer networks in file sharing networks in which nodes are linked without regard to interest or friendship relationships, the links 20 in system 10 are preferably formed because the members of the service are interested in particular content or are related in a social sense. Friends are members who like to communicate with each other about various topics of interest. Friends may know each other socially in an offline context or may be acquaintances only in an online context.

The links in system 10 make distributed database searching more efficient and more relevant than searches performed in other systems. For example, if a member desires to search peer nodes for a potential chat topic, that member can initiate a topic search at that member's peer node 12 (sometimes called the search origin). The search can then propagate outward from this origin to more distant nodes (e.g., nodes at a node distance of one from the origin, nodes at a node distance of two, nodes at a node distance of three, and so forth) following friendship links until the search terminates at an optional threshold node distance (e.g., a node distance of five) to prevent the search from becoming too remote.

Because the distributed database search is performed on the local databases associated with the friends of the member (and friends of friends, friends of friends of friends, etc. up to the optional threshold node distance), the local databases that are searched are more likely to contain topics and other information of interest to the member at the search origin than a distributed database search performed using links other than friendship links (e.g., IP address links to nodes without any known friendship relationship with the member at the search origin).

Members can create member profiles that contain information about themselves (e.g., member names, ages, likes and dislikes, etc.) Member profiles can contain links to other member profiles. Member profile links are shown as links 20 in FIG. 1. Member profiles can also contain links to topic profiles. Topic profiles can contain links to both member profiles and topic profiles.

Figure 2:
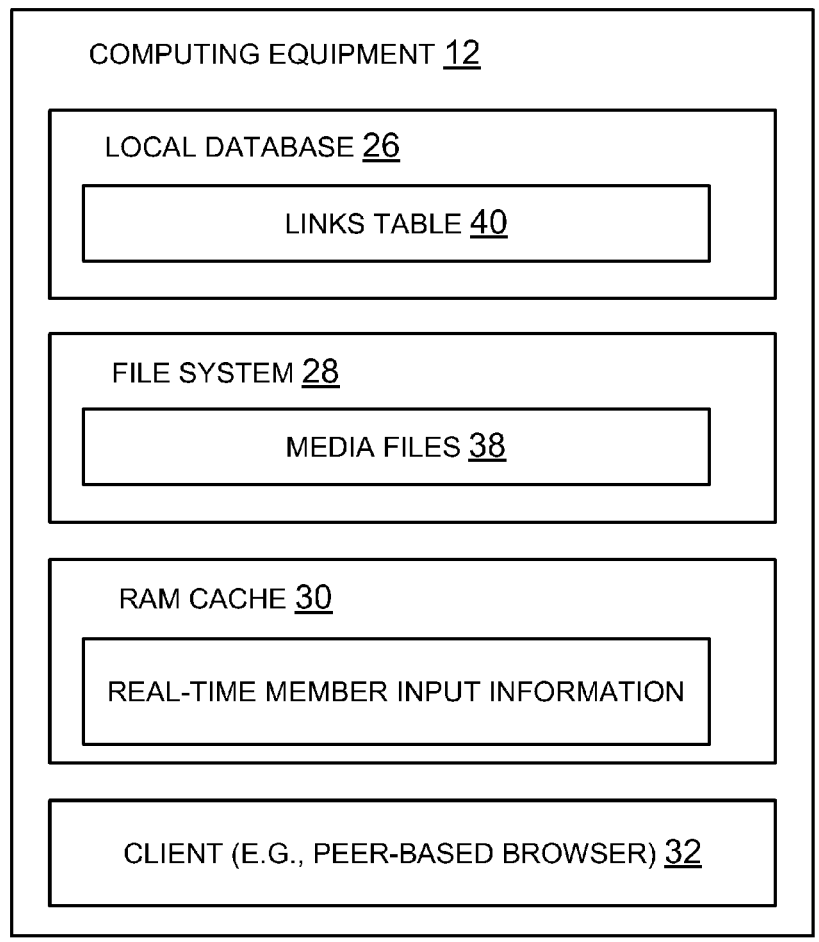
FIG. 2 is a diagram showing illustrative computing equipment at a member's peer node on which a member's client is run in accordance with the present invention.

Illustrative computing equipment 12 that is used at the peer nodes in system 10 is shown in FIG. 2. Equipment 12 may be a personal computer, a handheld computing device, a cellular telephone, or any other suitable computing equipment. Equipment 12 is used to hold data in various databases and storage media.

With the illustrative arrangement of FIG. 2, computing equipment 12 supports a local database 26, a file system 28, a RAM cache 30, and a client 32 (e.g., client software including a peer-based browser and other software components). Client 32 includes software for providing the member at computing equipment 12 with access to communications features such as chat functions, instant messaging, member and topic browsing, etc. Client 32 is sometimes referred to as a "browser." Client 32 interacts with database 26, file system 28, RAM cache 30, and software components for displaying advertisements and performing other suitable support functions. Client 32 interacts with remote computers over network links in system 10.

RAM cache 30 stores a session graph. The session graph is used to maintain information on the activities of a member during a session (from log on to log off). The session graph information can be displayed for the member. For example, the session graph information can be displayed for the member as icons in a history window. The member can click on an item in the history window to locally access associated information, without need to perform a remote database lookup operation or a local search through local database 26. Search results, profile browsing activity, and other member activities may be displayed in the history window.

The RAM cache 30 is formed from readily accessible memory such as random-access memory and is used to store data that is frequently accessed. Typically the size of the session graph grows throughout a member's session. For example, information may be added to the session graph as a member who is logged into the service interacts with other members and obtains information from their local databases.

Equipment 12 also includes a file system 28 for storing content such as media files 38. Media files 38 may be digital data in any suitable format (e.g., .JPG files, .MPG files, word processing documents, spreadsheets, computer programs, etc.). Media files 38 may, for example, be songs, videos, books, or any other suitable media contents including audio, video (including associated audio information), graphics, images, text, etc. Members use client 32 to share media files with other members.

Local database 26 is based on a local links table 40. Each links table 40 contains links between certain members and topics in the service.

Members and topics is the service of system 10 may be represented as objects. In general, there may be various types of objects in the system 10 other than member objects and topic objects, but for clarity, the present invention is described primarily in the context of a preferred system implementation in which there are two types of objects—member objects and topics objects. The member objects represent user accounts (people) in the system. Topic objects represent interests in the system (i.e., subjects in which members are interested). Objects may be linked to other objects. Objects may also have properties. The links between objects and their properties are stored in the links tables 40 at the peer nodes 12 (FIG. 1). Information from the local links tables 40 is also stored at supernode 14 (FIG. 1).

Typically the links table 40 of local database 26 contains information that a member requires at start-up such as topic information and member information for various topics and members of interest. The topic and member information can be presented to the member using any suitable graphical interface. With one suitable approach, client 32 displays various screens (e.g., search results screens, profile screens, etc.) containing information on available topics, members, and shared media. The screens preferably include images (e.g., icons) representing linked topics and members. A member can browse through the content in the service by clicking on displayed icons of interest.

The information that is presented to a given member using the client is preferably filtered to enforce privacy restrictions. The privacy restrictions are established using privacy settings contained in the links tables. By enforcing privacy restrictions, only information that other members have made available for sharing with the given member is visible in the client display screens.

Figure 3:
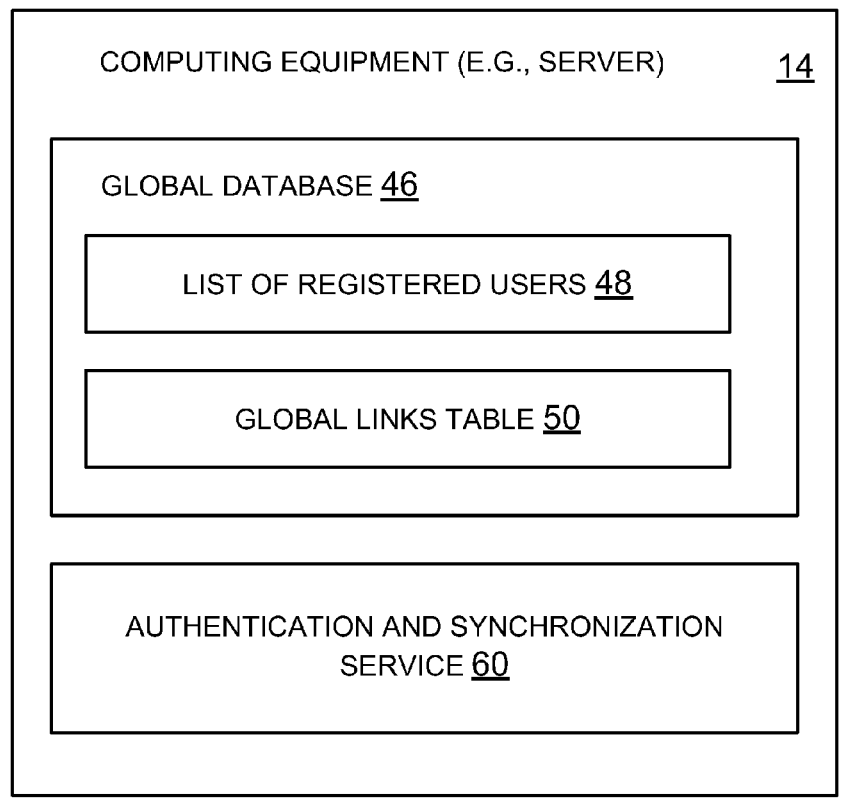
FIG. 3 is a diagram showing illustrative computing equipment that is used to maintain a global database and perform other operations in support of the peer-based communications service in accordance with the present invention.

Computing equipment 14 that is used at a supernode such as the supernode 14 of FIG. 1 is shown in FIG. 3. Computing equipment 14 may be based on a computer or computers (e.g., a single-computer server or one or more servers implemented using a distributed group of computers) or any other suitable computing equipment. The supernode contains a global database 46.

Global database 46 contains a list of registered users 48. List 48 may include, for example, information on usernames and passwords for registered members of the service, information on subscription level (e.g., whether each member has a regular account, family account, syndication account, etc.) and other suitable information on the members of the service. When logging into the service, a peer node 12 contacts supernode 14. Supernode 14 then compares information supplied by the member logging in (e.g., the member's user ID and password) to the information in list 48. This allows the supernode 14 to authenticate members of the service before they are provided with access to the service.

Global database 46 also contains a global links table 50 constructed from the local links tables 40 of the members of the service. Links table 50 may be, for example, a table formed by combining information from each of the tables 40 and contains information on members, topics, and shared content available through the service. A member who is unable to perform a distributed database search on the local databases of peer nodes 12 (e.g., because the member is unable to link to the network through other active peer nodes) or who otherwise desires to search at supernode 14 may search global links table 50. Global links table 50 serves as a global cache of local links table information and is updated during synchronization operations between supernode 14 and peer nodes 12 as members log on to the service. If desired, global links table 50 can be updated each time a member creates new content or edits links to members or topics.

Authentication and synchronization service 60 is used to support the authentication functions of computing equipment 14. Service 60 also helps to perform synchronization operations (e.g., to update global links table 50 and the local links tables 40 stored locally on the members' equipment 12).

The content and relationships associated with the members and topics in the system 10 may be represented as nodes and edges in a directional graph. Items in the system that have an identity (object ID) and that can serve as the start or end point of a link are referred to as objects. Objects are depicted as nodes in the directional graph. Links between objects and links defining the properties of objects are depicted as edges in the directional graph.

The information represented by the nodes and edges of the direction graph is contained in the links tables (e.g., tables such as local links tables 40 and global links table 50). Each row in the links table represents information associating two objects or represents an object and its descriptive attributes.

Figure 4A:
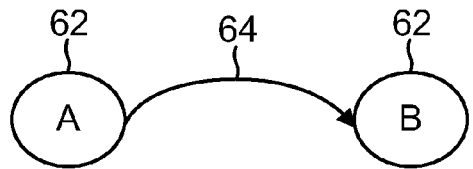
FIG. 4A is a directional graph representation of a unidirectional link from object A to object B in accordance with the present invention.

FIG. 4A shows two linked objects A and B, represented by directional graph nodes 62. Object A has an associated object ID of ID1. Object B has an associated object ID of ID2. Objects A and B may be members or topics. The arrow 64 between objects A and B in FIG. 4A forms a graph edge and represents the linking association between objects A and B.

Figure 4B:
FIG. 4B is a links table row representation of the link shown in the directional graph of FIG. 4A in accordance with the present invention.

The graph of FIG. 4A represents a row in a links table. The rows in a links table are sometimes referred to as links. A links table row corresponding to the graph of FIG. 4A is shown in FIG. 4B. As shown in FIG. 4B, link 66 contains an association between object A and object B. The link 66 of the links table row shown in FIG. 4B also contains descriptive attributes.

The association between objects in link 66 is formed using the values in the first two columns of the links table row. The first column contains the object ID for object A (i.e., ID1). The second column contains the object ID for object B (i.e., ID2). Object IDs in the second column are sometimes referred to as target IDs, which reflects how the objects listed in the second column serve as link endpoints as depicted by object B in FIG. 4A.

Figure 5A:
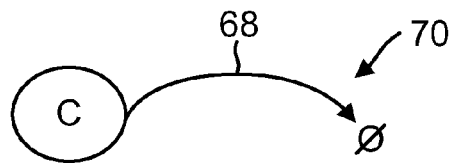
FIG. 5A is a directional graph representation of a property link associated with object C in accordance with the present invention.
Figure 5B:
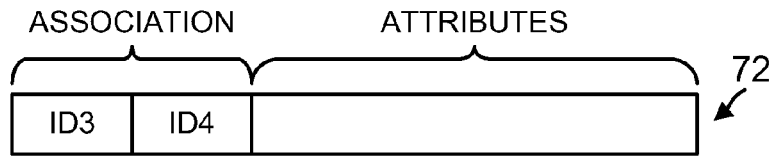
FIG. 5B is a links table row representation of the link shown in the directional graph of FIG. 5A in accordance with the present invention.

The link of FIGS. 4A and 4B is a unidirectional link between two objects A and B. Links may also be formed that define the properties of an object. A link of this type is shown in FIG. 5A. In the example of FIG. 5A, the directional arrow 68 emanating from the object C (which has an object ID of ID3) points to the empty or null set 70 (which has a target ID of ID4). The links table row 72 that corresponds to the graph of FIG. 5A is shown in FIG. 5B.

Some objects in the system are connected by bidirectional links. For example, when two members establish a friendship relationship, a bidirectional friendship link is formed between the members.

Figure 6A:
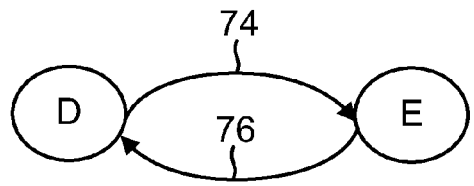
FIG. 6A is a directional graph representation of a bidirectional link between object D and object E in accordance with the present invention.

A bidirectional link is represented by two rows in the links table. An illustrative bidirectional link graph is shown in FIG. 6A. In the graph of FIG. 6A, object D is linked bidirectionally to object E, as shown by arrows 74 and 76. In this example, object D has an object ID of ID5 and object E has an object ID of ID6. The link from object D to object E is represented by links table row 78 of FIG. 6B. The link from object E to object D is represented by links table row 80 of FIG. 6B.

The links in the links table may have any suitable number of descriptive attributes. Descriptive attributes may be stored in appropriate columns of the links table (e.g., the rightmost columns of the table). With one illustrative arrangement, the descriptive attributes include a textual description for the link, a visibility (privacy) restriction, scoring or ranking data, an authenticity certificate, type information, and contextual labels. The scoring data may be used by the service in determining how to rank search results. The contextual labels may be used by the service to support functions in which detailed information about a link is needed. These are merely illustrative descriptive attributes that may be used in the links of the links table. Any suitable attributes may be used if desired.

In a preferred implementation of the invention, the links in the links table can be categorized as being object links or property links.

Figure 6B:
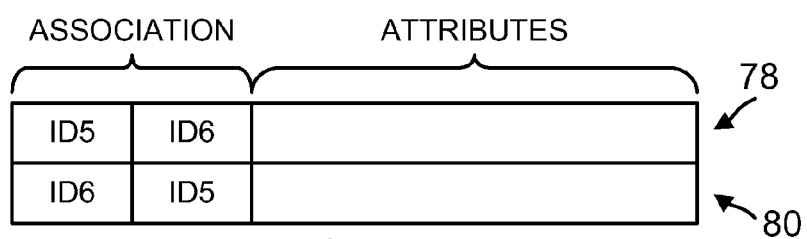
FIG. 6B is a links table representation of the link shown in the directional graph of FIG. 6A in accordance with the present invention.

An object link has association information that relates one object to another. Object links are depicted as graph edges between two nodes. The descriptive attributes associated with an object link define certain aspects of the link and may be used to label the graph edges in the directional graph. FIGS. 4A and 4B show an object link between objects A and B. FIGS. 6A and 6B show object links relating objects D and E.

A property link has association information that relates a single object to its descriptive attributes. An example of a property link is shown in FIGS. 5A and 5B. Property links are represented by directional graph edges emanating from one node and terminating at an empty set symbol. Like object links, the descriptive attributes associated with a property link may be used to label the link edges in a directional graph.

Figure 7:
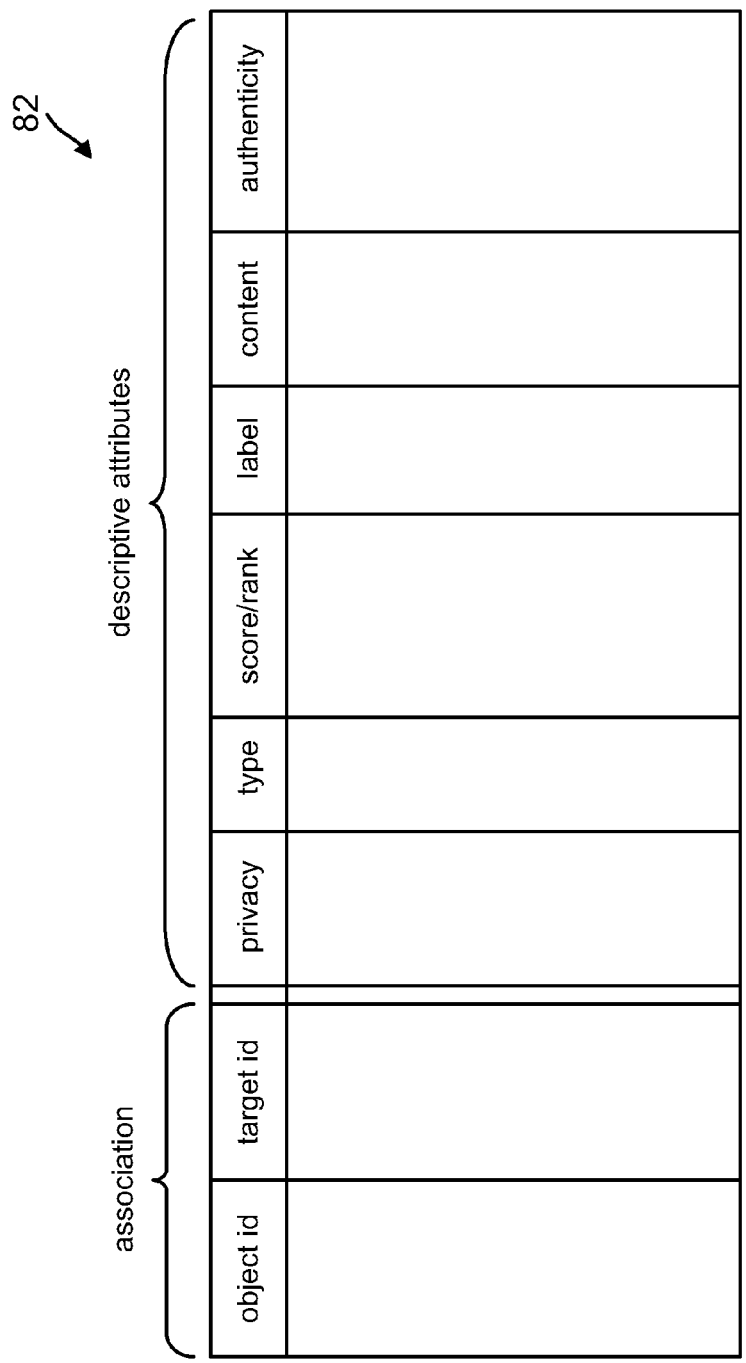
FIG. 7 shows and illustrative links table format that may be used to support the peer-based communications service in accordance with the present invention.

An illustrative links table 82 is shown in FIG. 7. In the example of FIG. 7, the table 82 has not been populated with values. In the links table 82, rows of the table represent links. The first two columns of each row form an association between an object ID and a target ID.

If the target ID in a particular row corresponds to an object, the link for that row is an object link. The descriptive attributes for that row set forth various aspects of the relationship between the two objects.

If the target ID in a particular row corresponds to the empty set, the link for that row is a property link. The descriptive attributes in the row are used to define the properties of the object identified by the object ID in the first column of the row.

The service preferably restricts the allowable range of values that may be used for the entries in table 82. For example, object IDs (e.g., the IDs in the first and second column of the links table) may be integers with values that fall within certain portions of a predefined valid ID space. In one illustrative ID space arrangement, ID values above $-2^{63}$ and less than or equal to 100 are used to identify topic objects. ID values above 100,000 and less than or equal to $2^{63}-1$ are used to identify member objects. If a target ID value lies in the range above 100 and less than or equal to 100,000, that target ID corresponds to the null set and the link having this target ID is a property link. An ID space of this type is used in describing the present invention, but is merely illustrative. In general, any suitable ranges and formats may be used for the values of the IDs and other entries in the links table.

In a preferred implementation of the invention, there are eight types of links. Member links may be categorized as being (1) a member property link that links a member to the empty set and is used to assign a descriptive attribute (property) to a member, (2) a member friend link that links a member to another member, and (3) a member interest link that links a member and a topic. The remaining 5 types of links are topic links and may be categorized as being (3) a topic property link that links to the empty set and is used to assign a descriptive attribute (property) to a topic, (4) a topic related link that links one topic to another, (5) a topic category link that links a topic to another topic and which is the first created (or otherwise distinguished) topic related link formed for the topic, (6) a topic member link that links a topic to a member, and (7) a topic owner link that links a topic to a member and which is the first created (or otherwise distinguished) topic member link formed for the topic, and (8) a topic member link that links a topic to a member.

The use of the links table to support the features of the communications service and the use of member and topic objects and various types of links can be illustrated by an example. Consider the situation in which the communications service has three members: John, Bill, and Lisa. John and Bill are friends. Lisa is Bill's sister. John loves computers, particularly personal computers (PCs) manufactured by rivals IBM and Dell, but does not want anyone to know how much. John is president of a PC club in the service. John is willing to let his direct friends such as Bill join the PC club, but does not want to involve friends of friends or more remote members in the club.

The links tables in the system serve to define the relationships between the John, Bob, and Lisa and the topics in which they are interested and defines descriptive attributes for the members and topics.

Figure 9:
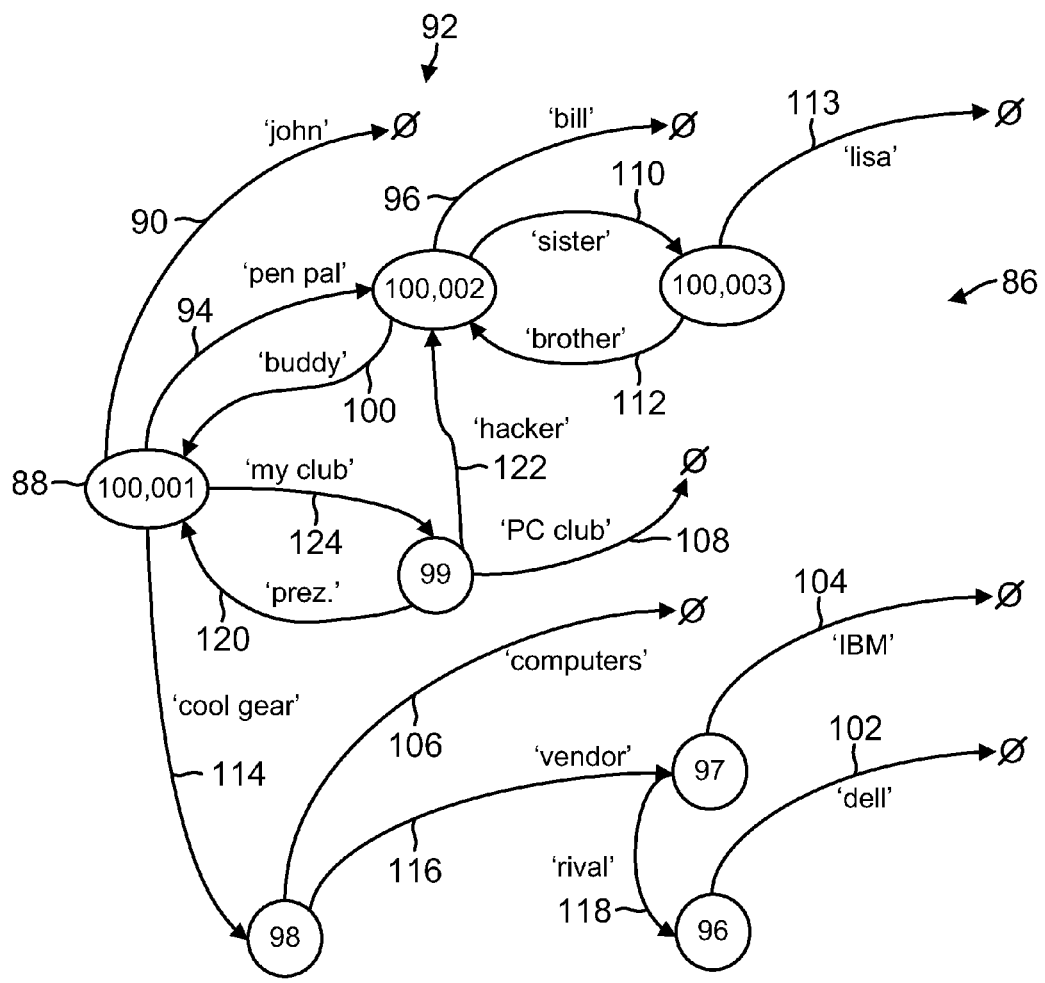
FIG. 9 is a directional graph representation of the illustrative links table of FIG. 8 in accordance with the present invention.

A links table 84 having entries corresponding to the illustrative three-member example of John, Bill, and Lisa is shown in FIG. 8. A corresponding graph 86 for this illustrative example is shown in FIG. 9.

Each row in table 84 of FIG. 8 corresponds to a link. Not all of the descriptive attributes in the example of FIG. 8 have been given value, to avoid over-complicating the drawing. Illustrative descriptive attribute values have been included for "content" and "type" descriptive attributes. The content attribute may be used to associate certain text or other content with a link. The type attribute in this example is a number that corresponds to the link type (1 for member property link, 2 for member friend link, 3 for member interest link, 4 for topic property link, 5 for topic related link, 6 for topic category link, 7 for topic owner link, and 8 for topic member link). Type attributes may be stored in the links tables by the clients 32.

The leftmost column of table 84 contains an object ID for the origin of the link. The target ID column (the second column from the left in FIG. 8) contains an identifier for the target or endpoint of each link. With the illustrative ID space described above, links that terminate in member objects have target IDs greater than 100,000. Links that terminate in topic objects have target IDs of less than or equal to 100. Links that terminate in the empty set and that are therefore used only to associate a descriptive attribute with the object from which the link is originating, have a target IDs above 100 and less than or equal to 100,000.

The link of the first row of links table 84 has an object ID of 100,001 and a target ID of 10,000. The target ID lies between 100 and 100,000, so the first row link points to the empty set. As indicated by the type value of 1 in the first row, the first row link is a member property link. In particular, in the first row link, the property "John" is being assigned to the object ID 100,001. Object ID 100,001 therefore represents member "John." Arrow 90 of FIG. 9 is shown as pointing from object 88 to the empty set 92. Arrow 90 is labeled "John" indicating that this link from object 88 to the empty set is being used to assign the content attribute "John" to object 88.

The member property links of rows 5 and 8 of table 84 are similarly used to identify object 100,002 as corresponding to member "Bill" and object 100,003 as corresponding to member "Lisa" (links 96 and 113 of FIG. 9).

The link of the second row of links table 84 (FIG. 8) points from the John member object (object ID 100,001) to the Bill member object 100,002. This association between members is a member friend link (link type 2) and has the descriptive attribute "pen pal" as shown adjacent to link 94 of FIG. 9. The "pen pal" attribute for link 94 indicates that (according to John) Bill is John's pen pal. John supplied the service with the pen pal attribute when John formed the link 94 to member Bill. During use of the service, Bill formed a member friend link 100 to John and provided a corresponding descriptive attribute "buddy" to the service. The entries for link 100 of FIG. 9 are shown in the sixth row of table 84 in FIG. 8.

The brother-sister relationships between Bill and Lisa are given by member friend links 110 and 112 in FIG. 9 and by the corresponding rows (7 and 9) in table 84 of FIG. 8.

Four of the objects in this example are topic objects: objects 96, 97, 98, and 99. As indicated by topic property links 102, 104, 106, and 108 in FIG. 9 and the corresponding rows in table 84 of FIG. 8, objects 96, 97, 98, and 99 are associated with the topics Dell, IBM, computers, and PC club, respectively.

John is interested in computers, so John formed a link to the computers object (object ID 98), as shown by link 114 of FIG. 9. The descriptive attribute that John assigned to this link is shown by the label "cool gear."

The topic "computers" is linked to the topic IBM, as shown by link 116. The relationship of IBM to computers is that of vendor, as shown by the label "vendor."

The topic IBM is linked to the topic Dell, as shown by link 118. The relationship of Dell to IBM is that of rival, as shown by the label "rival." The relationship attributes for links 114, 116, and 118 are shown in the content column for rows three, fourteen, and twelve of links table 84, respectively. Link 114 is a member interest link that represents John's interest in the topic computers. Links 116 and 118 are topic related links. Link 116 relates the subtopic IBM to the topic computers. Link 118 relates the topic Dell to the topic IBM. Link 116 is a topic category link, because link 116 was (in this example) the first topic related link to be formed that originated at the topic computers.

As indicated by link 120, John is president (labeled "prez") of the PC club (topic 99). Bill is also a member of the PC club, as shown by link 122 (labeled "hacker"). Links 120 and 122 are topic member links. In this example, John created the PC club topic in the service and is its owner. Link 120 is therefore a topic owner link.

John's interest in the PC club is represented by the member interest link 124. This link has the associated descriptive attribute "my club," as shown in FIG. 9 and the fourth row of table 84 (FIG. 8).

Figure 10:
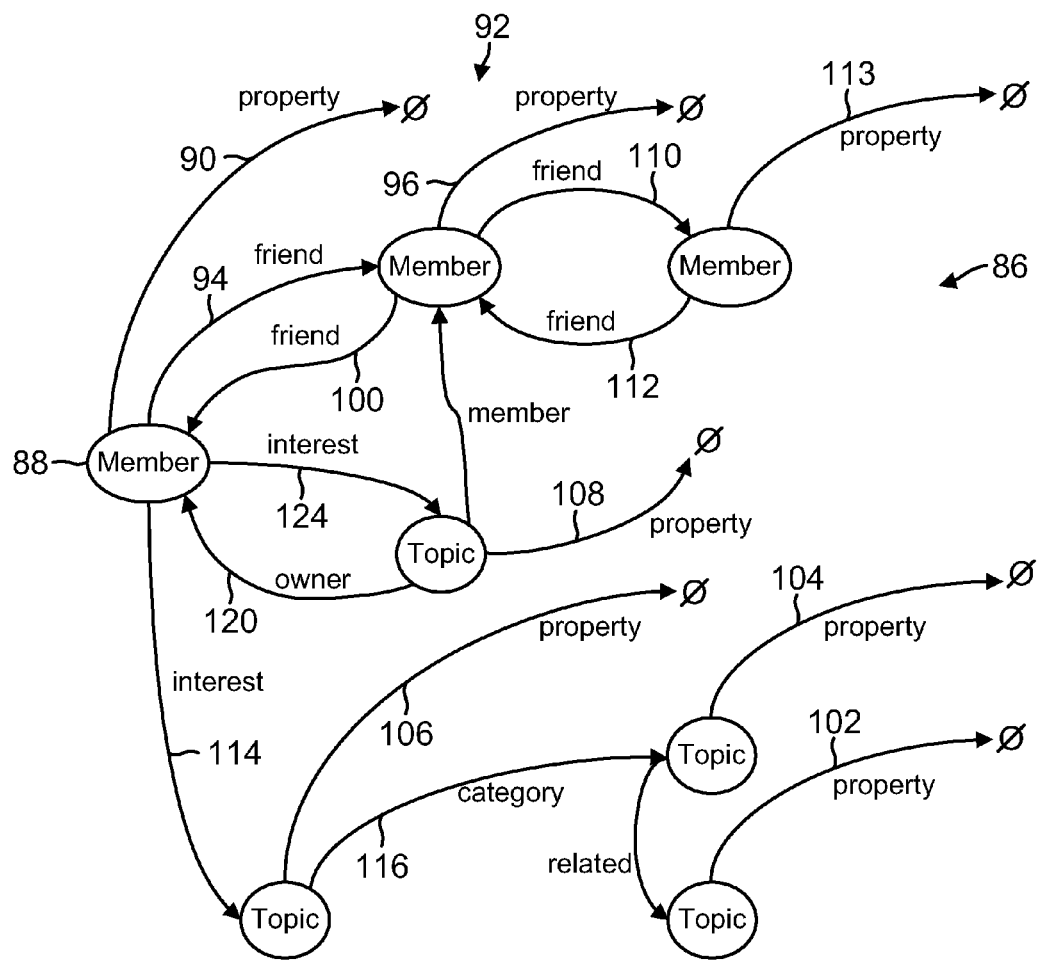
FIG. 10 is a directional graph representation of the illustrative links table of FIG. 8 in which links are labeled with link type information in accordance with the present invention.

A version of the illustrative graph of FIG. 9 in which the objects have been labeled as member and topic objects as appropriate is shown in FIG. 10. In the version of the graph shown in FIG. 10, each link has been labeled to show its type (e.g., member or topic property, friend, interest, member, owner, category, or related).

The communications service preferably provides members with the ability to establish privacy settings. With one suitable arrangement, the service allows members to adjust link privacy settings during the link creation or editing process. The privacy settings are used by the service to provide selective access to content. Information that members desire to keep private will not be revealed in public. Information that members desire to share widely will be made publicly available. Intermediate privacy settings (e.g., to provide access only to friends or friends of friends) are also supported.

Figure 11:
FIG. 11 shows a links table partially filled with illustrative entries including privacy settings in accordance with the present invention.

Continuing with the discussion of the illustrative three-member example of FIGS. 8, 9, and 10, a version of the illustrative links table 84 in which illustrative entries have been supplied for the "privacy" descriptive attribute column is shown in FIG. 11. The privacy attribute for each link controls who is provided with access to the associated content. Content is displayed by each member's client as appropriate, depending on the values of the privacy attributes. The client of a member that is restricted from viewing certain content is not provided with access to this content through distributed database searches and supernode synchronization operations and does not display this content for the member.

When a link (i.e., a row in table 84) has privacy setting of 0, the associated content is accessible to the content creator only. A privacy setting of 1 makes content accessible to all members who have linked to the content creator as friends. A privacy setting of 2 is used to make content accessible to all members at a node distance of two from the creator (i.e., friends of friends). A privacy attribute value of 3 is used to make content globally visible to all members of the service. A privacy attribute of 4 is used to make content accessible to users both inside and outside the service (e.g., on the web). Content may be made visible to no one (i.e., deleted) by setting the associated privacy attribute to −1.

In the example of FIG. 11, the fact that object 100,001 is associated with "John" is available to everyone in the communications service. Accordingly, the property link of the first row (in which member object 100,001 is assigned the property "John") has a privacy value of 3.

An example of a link that is completely private is the link of the third row of links table 84. In the third row of table 84, John has linked to the computers topic (object 98) (see link 114 of FIG. 9). John does not want to share the fact that he is interested in the computers topic with anyone (not even friends), so when John created link 114 he marked it as being viewable only to himself. The privacy attribute value for link 114 is 0, as shown in the privacy column of row three of links table 84 (FIG. 11).

An example of a link that is shared at the "friends" level is the link of the fourth row of table 84. This link, shown as link 124 in FIG. 9, is a member interest link and was created by John because of his interest in the PC club (object 99). John is willing to reveal that he is a member of the PC club to his friends, so when John created link 124 with his client, John set the privacy level for link 124 to "friends" (a privacy attribute value of 1).

Figure 12:
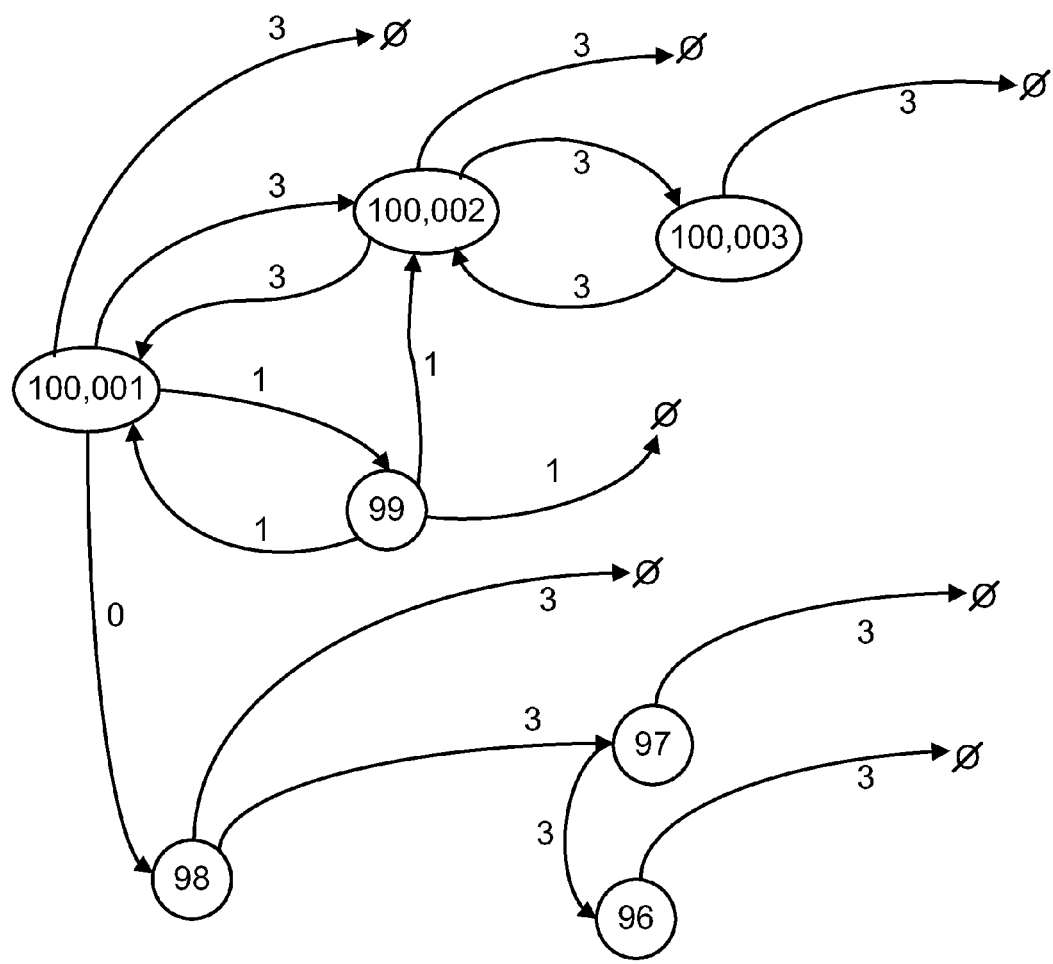
FIG. 12 is a directional graph representation of the illustrative links table of FIG. 11 in which links are labeled with privacy attribute values in accordance with the present invention.

A version of the illustrative graph of FIG. 9 in which links have been labeled to show their associated privacy attribute values is shown in FIG. 12. The privacy attributes are stored with the other descriptive attributes in the links table, as shown in FIG. 11. Clients 32 and supernode 14 use the privacy attribute values from the links tables to determine whether or not access is permitted when providing content to members. During this process, the links tables are examined to determine whether links are unidirectional or bidirectional. Bidirectional links are links in which both a forward link and a backlink are present. Bidirectional links are expressed as a pair of associated rows in the links table. One row is used to form a link away from a given object (a forward link). The other row is used to form a link back to the given object.

In situations in which there is a mutual linking relationship between members, members are said to be "friends." The presence or absence of link/backlink pairs in the links table is used to evaluate whether members are friends, friends of friends, etc. This friendship information is used in determining what level of access is to be provided. For example, in determining whether member A is a friend of member B, so that A can view some of B's material that has a link privacy setting of 1, the links table information is evaluated to determine whether a bidirectional set of links between A and B exists.

In evaluating friendship relationships to determine which content is to be made available to a given member, the global links table 50 is processed at the supernode 14. The supernode determines what type of linking relationship exists between various objects (unidirectional, bidirectional, node distance, etc.). Based on the results of this evaluation, the supernode provides a local copy of the links table to the given member in which the appropriate links are included. The given member can then use the local subset of the global links table to access content in accordance with the privacy settings.

FIGS. 13-24 illustrate how privacy settings, node distance, and the presence or absence of bidirectional links affect content visibility in the service. In the graphs of FIGS. 13-24, objects are represented by lettered circles, the empty set is represented by the null symbol (Ø), and links are represented by arrows. Bidirectional links exist when respective objects are linked in both the forward and backward direction by a pair of arrows. The numbers and symbols used to label each link represent ranges of privacy attribute values. During use of the service, the member at which a link originates is able to set a privacy setting for that link to a desired value. In general, objects can be associated with members or topics. In this discussion, we assume that object A represents a member A of the service who desires to view linked content. The other lettered objects in the FIGS. are assumed to correspond to other members of the service or topics.

Figure 13:
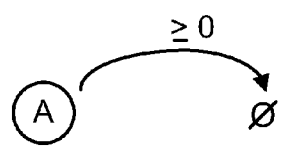
FIG. 13 is a labeled directional graph showing which privacy settings will allow member A to view a property link originating at member A in accordance with the present invention.

FIG. 13 shows a unidirectional link between an object A and the empty set. The link of FIG. 13 is a property link. Member A can see all property links originating at object A and terminating on the empty set that have privacy attribute values of 0 or greater (as indicated by the label "≥0"). Member A cannot view property links of the type shown in FIG. 13 if the privacy attribute setting is −1. A −1 privacy setting is used to delete a property link, so that even its creator A can no longer view the link.

Figure 14:
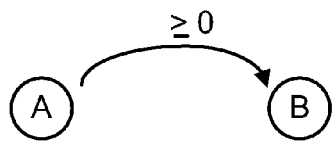
FIG. 14 is a labeled directional graph showing which privacy settings will allow member A to view an object link originating at member A in accordance with the present invention.

FIG. 14 is a graph of a link between member A and object B. The FIG. 14 link is unidirectional. As indicated by the label "≥0", member A can view object B, provided that the link of FIG. 14 has a privacy attribute value greater than or equal to 0.

Figure 15:
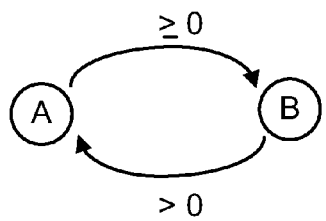
FIG. 15 is a labeled directional graph showing which privacy settings will allow member A to view an object link originating at member A and an object link originating at member B and terminating at member A in accordance with the present invention.

FIG. 15 is a graph of a bidirectional link. Because A and B are linked by a bidirectional link, A and B are friends. The upper arrow in FIG. 15 is labeled "≥0", indicating that member A can see the link to member B, provided that the associated privacy setting is 0 or greater. The lower arrow in FIG. 15 is labeled ">0", indicating that member A can see the link from member B (one of B's links), provided that the associated privacy setting is greater than 0 (i.e., if B has decided to share this information with friends such as member A).

FIGS. 16-24 show how the privacy rules work when there are more distant relationships involved.

Figure 16:
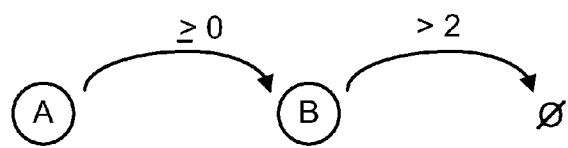
FIG. 16 is a labeled directional graph showing which privacy settings will allow member A to view an object link from object A to object B and a property link originating at object B in accordance with the present invention.

In FIG. 16, A is linked to B and B has an associated property link. The property link may be, for example, B's name. A can view the link to B if the privacy setting for the link from A to B is greater than or equal to 0. A can view the property link originating at B, provided that the privacy setting for this link is greater than 2. A and B are not friends, so if the privacy setting for the property link from B is 2 or less, the property link will not be accessible to A.

Figure 17:
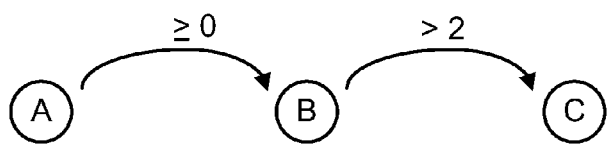
FIG. 17 is a labeled directional graph showing which privacy settings will allow member A to view an object link from member A to object B and an object link from object B to object C in accordance with the present invention.

In FIG. 17, A is linked to B and B is linked to C. The link from A to B is unidirectional, because A and B are not friends. A can view the link from A to B if the privacy setting for the link from A to B is greater than or equal to 0. A can view the link from B to C if the privacy setting for the link from B to C is greater than 2. For example, if C is a topic in which B is interested, A will only be able to view B's interest in topic C if B has set the privacy value for the B to C link to 3 (visible to everyone in the service) or 4 (visible to the members and non-members).

Figure 18:
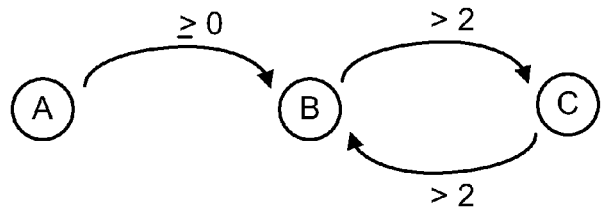
FIG. 18 is a labeled directional graph showing which privacy settings will allow member A to view an object link from member A to object B and object links between object B and object C in accordance with the present invention.

FIG. 18 is a graph of the situation in which B and C have a bidirectional link. Even though B and C are friends, however, A cannot view the B to C link or the C to B link unless the privacy settings for these links are greater than 2. B may maintain B's relationship with C private by designating the B to C link with a privacy setting of 2 or less. Similarly, C may maintain C's relationship with B private by setting the C to B link privacy attribute to 2 or less.

Figure 19:
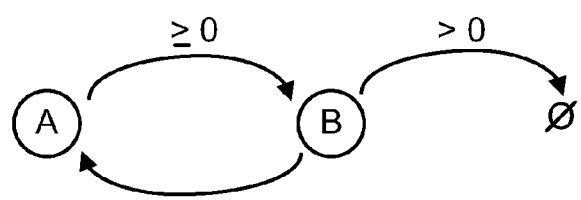
FIG. 19 is a labeled directional graph showing which privacy settings will allow member A to view object links between member A and object B and a property link originating at object B in accordance with the present invention.

The graph of FIG. 19 illustrates the situation in which A and B are friends and B has an associated property link. The friendship relationship between A and B is represented by the bidirectional link between A and B. Member A can view the link to B, so long as the link has not been deleted (i.e., provided that the privacy setting for the link is greater or equal to 0). Because A is a friend of B, if B sets the privacy setting for B's property link to 1 or higher, A can view the property link.

Figure 20:
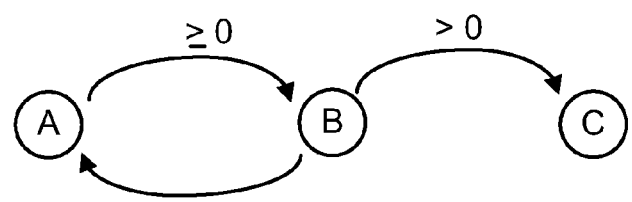
FIG. 20 is a labeled directional graph showing which privacy settings will allow member A to view object links between member A and object B and an object link from object B to object C in accordance with the present invention.

The results are similar when B has linked to an object C, as shown in FIG. 20. Member A can view the link A created between A and B. Because A and B are friends, A can view B's links such as B's link to object C, provided that B set the privacy attribute for the B to C link to at least 1 (i.e., viewable to friends or more publicly).

Figure 21:
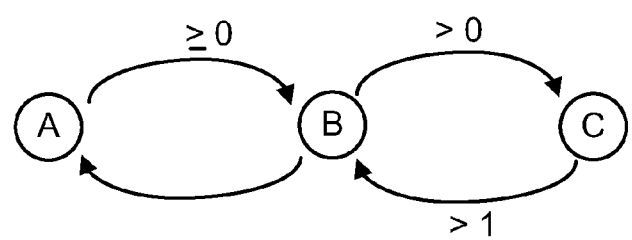
FIG. 21 is a labeled directional graph showing which privacy settings will allow member A to view object links between member A and object B and object links between object B and object C in accordance with the present invention.

FIG. 21 illustrates a friend-of-friend relationship between A and C. As shown in the graph of FIG. 21, member A can view the link A created from A to B, so long as the link has not been deleted (i.e., the privacy attribute is greater or equal to zero). Member A is a friend of B, so A can also view the link from B to C, provided that B set the privacy level for this link to at least 1 (i.e., so that B's friends can view the link). B and C are friends, as evidenced by the backlink from C to B. If C set the privacy level for the C to B link to 2 (friends of friends) or higher, A can view this link by virtue of the friend-of-friend relationship between A and C.

The graphs of FIGS. 22-24 illustrate link visibility scenarios in which there are three levels of linking. In these FIGS., member A is linked to object B, which is linked to object C. Object C has a property link or an object link to object D. Each link in FIGS. 22-24 is annotated to indicate what privacy attribute values are needed for A to be able to view the link.

Figure 22A:
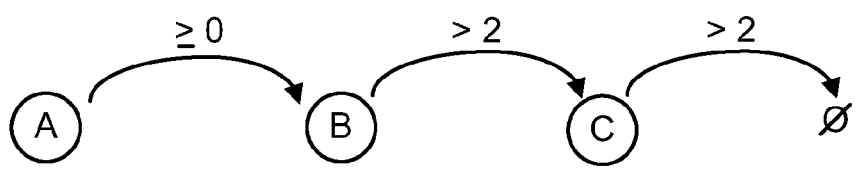
FIG. 22A is a labeled directional graph showing privacy settings required for member A to view an object link from member A to object B, an object link from object B to object C, and a property link originating at object C in accordance with the present invention.

In FIG. 22A, member A can see the link A created to member B, so long as the link has not been deleted, as indicated by the label "0". A is not a friend with B, so A can only view the link from B to C if B has set the privacy value for this link to 3 (viewable to all members of the service) or higher. The property link associated with object C is also only viewable by A if C has set the privacy value to at least 3.

Figure 22B:
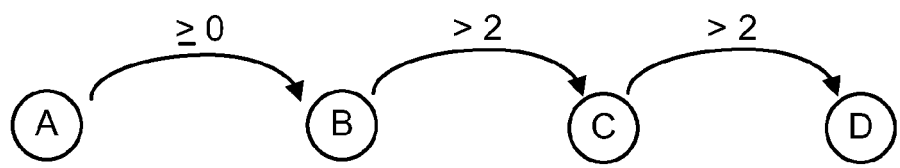
FIG. 22B is a labeled directional graph showing privacy settings required for member A to view an object link from member A to object B, an object link from object B to object C, and an object link from object C to object D in accordance with the present invention.

In FIG. 22B, the link from object C is an object link to object D, rather than a property link. However, the visibility rules are the same as for FIG. 22A. The link from A to B is visible to A so long as it has not been deleted. B's link to C is only visible to A if B has made this link viewable to all members of the service (a privacy attribute value of 3) or publicly (a privacy attribute of 4). The object link from object C to object D is only viewable by A if it has a privacy value of at least 3.

Figure 22C:
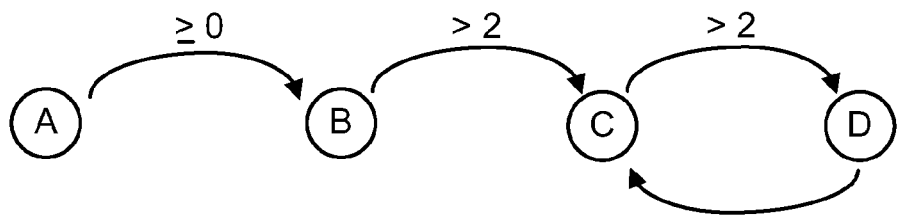
FIG. 22C is a labeled directional graph showing privacy settings required for member A to view an object link from member A to object B, an object link from object B to object C, and object links between object C and object D in accordance with the present invention.

As shown in FIG. 22C, even if D has linked to C, so that C and D are friends, A will not be able to view the C to D link unless its privacy setting is at least 3. A is neither a friend of D nor a friend-of-friend with respect to D, so A can only view D's link to C if its privacy setting is at least 3.

Figure 23A:
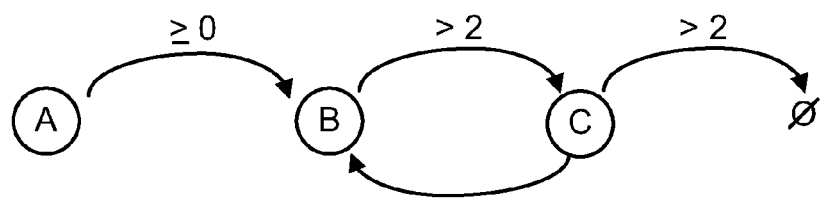
FIG. 23A is a labeled directional graph showing privacy settings required for member A to view an object link from member A to object B, object links between object B and object C, and a property link originating at object C in accordance with the present invention.
Figure 23B:
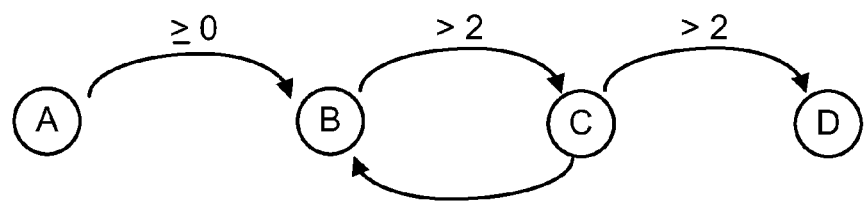
FIG. 23B is a labeled directional graph showing privacy settings required for member A to view an object link from member A to object B, object links between object B and object C, and an object link from object C to object D in accordance with the present invention.
Figure 23C:
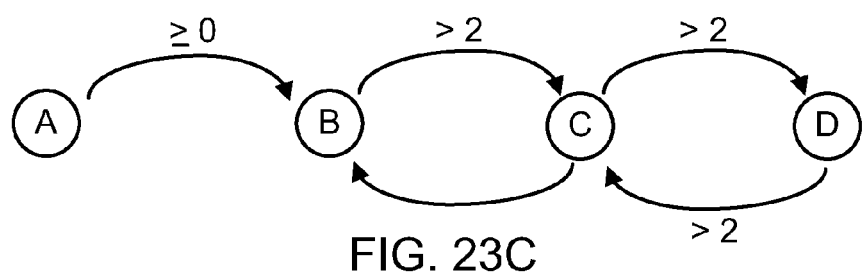
FIG. 23C is a labeled directional graph showing privacy settings required for member A to view an object link from member A to object B, object links between object B and object C, and object links between object C and object D in accordance with the present invention.

FIGS. 23A, 23B, and 23C illustrate the impact of a friendship relationship between B and C. FIGS. 23A, 23B, and 23C illustrate how A is not able to view more of B's, C's or D's links by virtue of the friendship between B and C.

As shown in FIG. 23A, even though there is a bidirectional link between B and C in the situation of FIG. 23A that is not present in the situation of FIG. 22A, A in FIG. 23A is still not able to view C's property link unless it has a privacy setting of at least 3. The visibility of B's link to C is also unchanged from the situation in 22A.

Similarly, even though there is a bidirectional link between B and C in FIG. 23B that is not present in the situation of FIG. 22B, the object link from C to D is not visible unless C has designated this link as having a privacy setting of at least three. The visibility of B's link to C is also unchanged from the situation in 22B.

The example of FIG. 23C shows how the friendship between B and C does not affect the visibility of C's or D's links. As in the scenario of FIG. 22C, A is only able to view C's link to D and D's link to C in the event that these links have been assigned privacy values of at least 3. This is because regardless of the relationship between B and C, A is still not a friend or a friend-of-friend with respect to C or D. The visibility of B's link to C is also unchanged from the situation in 22C.

Figure 24A:
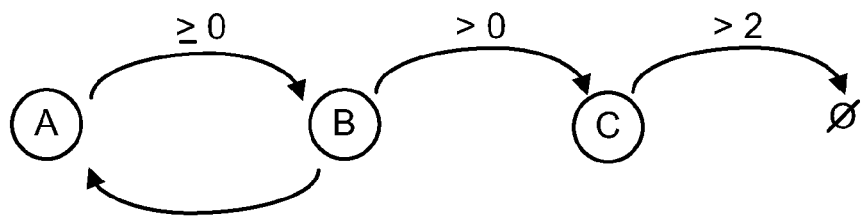
FIG. 24A is a labeled directional graph showing privacy settings required for member A to view object links between member A and object B, an object link from object B to object C, and a property link originating at object C in accordance with the present invention.
Figure 24B:
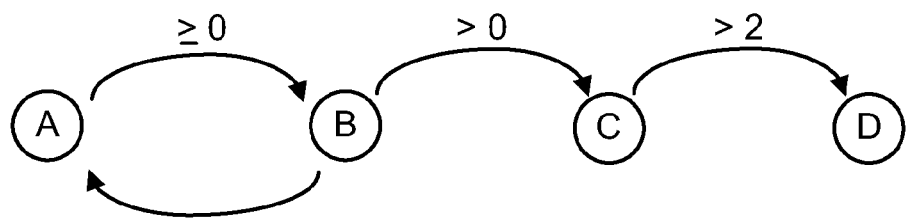
FIG. 24B is a labeled directional graph showing privacy settings required for member A to view object links between member A and object B, an object link from object B to object C, and an object link from object C to object D in accordance with the present invention.
Figure 24C:
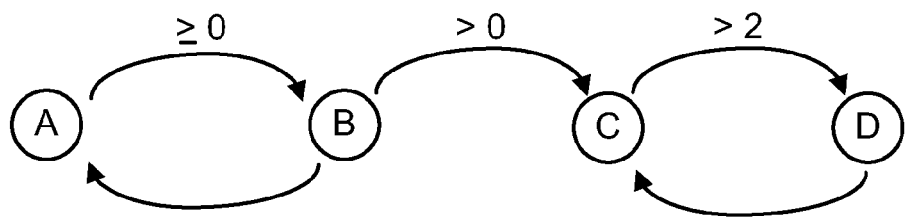
FIG. 24C is a labeled directional graph showing privacy settings required for member A to view object links between member A and object B, an object link from object B to object C, and object links between object C and object D in accordance with the present invention.

FIGS. 24A, 24B, and 24C illustrate the impact of a friendship relationship between A and B.

As shown in FIG. 24A, when A and B are friends (as evidenced by the bidirectional linking relationship between A and B), member A can view B's link to C if it has a privacy attribute value of greater than 0. For example, if B set the privacy attribute value for the link from B to C at 1 (friends can view), A will be able to view the B to C link. Member A is not able to view C's property link unless C has assigned a privacy attribute value of at least 3 to this link. Member A is therefore not provided with greater access to C's property link in the FIG. 24A scenario than in the scenario of FIG. 22A. The presence of the A to B friendship does not make A's relationship to C any closer, so A's visibility of C's links is unchanged by the A to B friendship.

The situation of FIG. 24B is similar. The presence of the A to B friendship allows A to view B's link to C provided that the link has a privacy attribute value of at least 1 (friends). The friendship between A and B does not, however, make it any easier for A to view C's link to D. A privacy attribute value of at least 3 is still needed, as in the scenario of FIG. 22B in which A and B were not friends.

FIG. 24C illustrates the situation in which C and D are friends. Although the presence of the A to B friendship allows A to view B's link to C if the B to C link has a privacy attribute value of at least 1, A is no more able to view the C to D or D to C links of FIG. 24C than in the situation of FIG. 22C (in which there was no A to B friendship relationship). A privacy attribute value of at least three is required before A will be able to access these links.

Figure 24D:
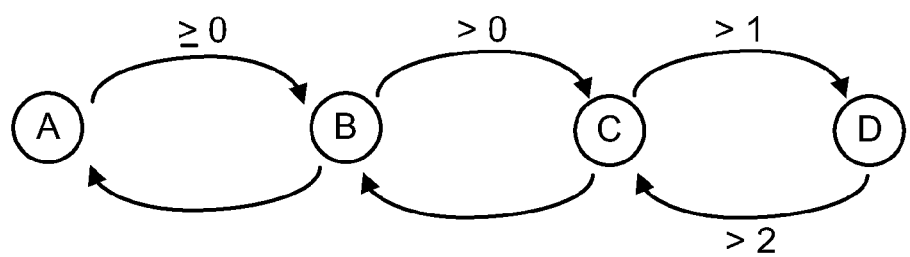
FIG. 24D is a labeled directional graph showing privacy settings required for member A to view object links between member A and object B, object links between object B and object C, and object links between object C and object D in accordance with the present invention.

FIG. 24D illustrates the situation in which A and B are friends, B and C are friends, and C and D are friends. In this case, A and C are related as friends of friends. Member A can view the link from A to B if the privacy setting is greater than or equal to 0, because this is A's own link. Member A can view the link from B to C if the privacy setting for this link is 1 or greater (i.e., visible to friends). The C to D link is visible to A if it has a privacy setting of 1 or greater (visible to friends of friends). The D to C link is only visible to A if this link has a privacy setting of 3 (viewable to members of the service) or higher, because even with the friendship relationships of FIG. 24D, A and D are not friends of friends and are related only by virtue of both being service members.

The clients 32 (FIG. 2) use the privacy attributes and other information from the links tables to determine how to present the links and content of the service to the members on their computing equipment. With one suitable arrangement, members and topics are displayed as icons. The icons can be labeled with descriptive attributes. For example, a member icon can be labeled with the member's name and a topic icon can be labeled with the topic title.

Members can browse for members and topics of interest by clicking on visible member and topic icons. Members can also search for members and topics of interest using a search engine. The search results produced by the search engine are presented to the member in accordance with the privacy settings. If a member is not allowed to view certain topics or members because of privacy settings, the member's client will not display the prohibited topic or member icons during browsing and will not display the prohibited topic and member icons in the search results presented to the member.

The type of graphical user interface that is used by client 32, to display topic and member information and communications service features to members is influenced by factors such as available on-screen real estate, screen attributes (color, resolution, etc.), the desired balance between reducing visual clutter (e.g., by reducing or eliminating text) and improving ease of use (e.g., by providing explanatory text), etc. In general, any suitable arrangement may be used by the client 32 to display service content and features to the members. One illustrative arrangement is illustrated in the examples of FIGS. 25-29. Navigational options and on-screen options for providing features such as search functions, chat and instant messaging functions, content sharing, and other peer-to-peer services are not generally shown in the illustrative screens to avoid over-complicating the drawings. Such features may generally be accessed using drop-down menus, on-screen buttons that members may click on, etc.

The screens of FIGS. 25-29 illustrate how privacy settings and relationships between members and topics affect the visibility of member and topic icons. FIGS. 25-29 show the type of information that client 32 displays in the context of the three-member example of John, Bill, and Lisa that was first introduced in connection with FIGS. 8 and 9.

Figure 25:
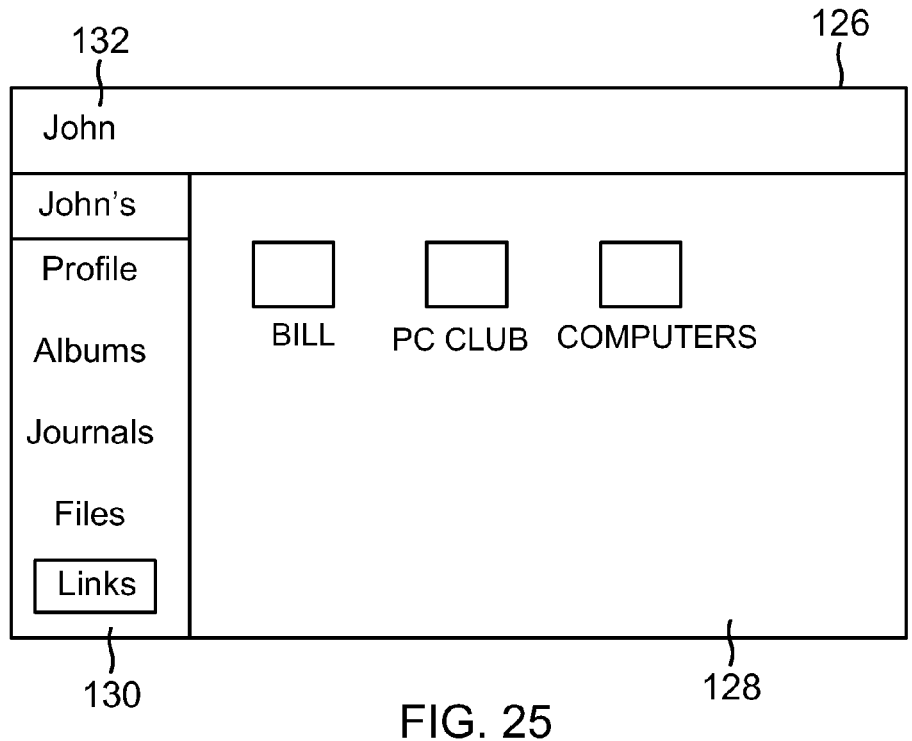
FIG. 25 is an illustrative screen that a client can display for a given member on that given member's computing equipment when the member is using the peer-based communications service to view the members and topics to which the given member has linked in accordance with the present invention.

FIG. 25 shows an illustrative screen 126 that may be used to display topic and member icons to which John has linked. The illustrative screen 126 of FIG. 25 has a main display region 128 and a region 130 that contains information on the type of content being displayed in region 128. In the example of FIG. 25, icons representing John's member and topic links are being displayed in region 128, so the "links" option of region 130 has been highlighted. Region 132 is used to list the name of the member whose links are being viewed.

An icon for member Bill is displayed for John in region 128 because John's link to Bill has a privacy setting of 3 (visible to all members in the service, including John). An icon for the PC club topic is displayed for John in region 128 because John's link to the PC club topic has a privacy setting of 1 (visible to John and John's friends). An icon for the computers topic is displayed for John in region 128, because John's link to the computers topic has a privacy setting of 0 (visible to John only).

Figure 26:
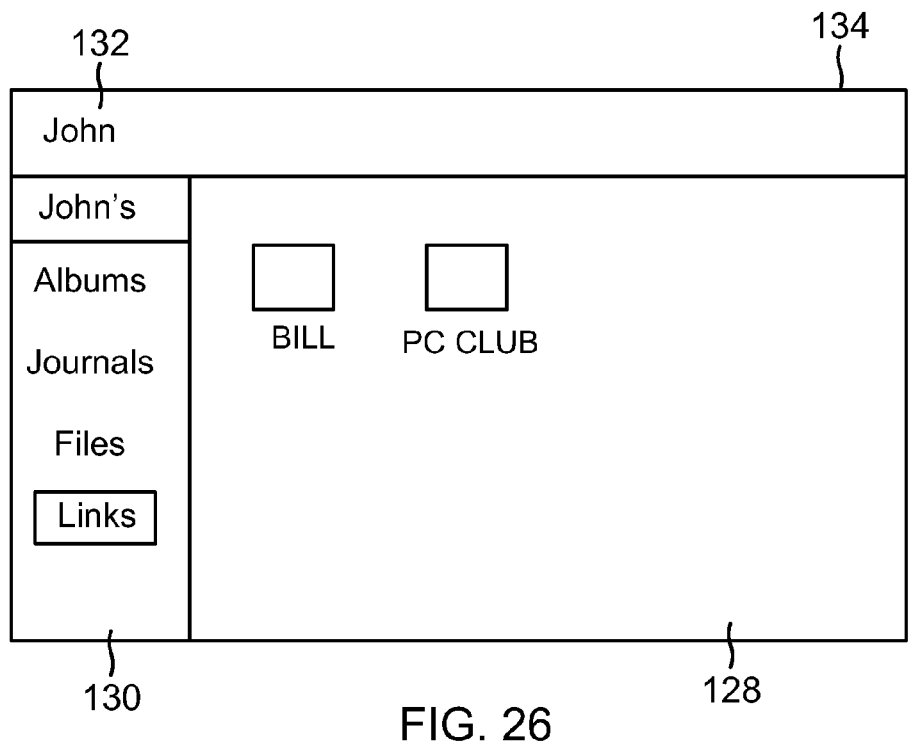
FIG. 26 is an illustrative screen that a client can display for a friend of the given member when viewing the given member's linked members and topics in accordance with the present invention.

Bill's view of John's links differs from John's view of John's links, as illustrated in FIG. 26. The screen 134 that is shown in FIG. 26 contains Bill's view of John's links. The Bill icon is present in region 128 because John's link to Bill has a privacy setting of 3 (visible to all members of the service, including Bill). The PC club icon is displayed for Bill in region 128 because John's link to the PC club topic has a privacy setting of 1 (visible to John and John's friends such as Bill). The computers topic icon that was shown in John's view of John's links (FIG. 25) is not displayed for Bill, because John set the privacy attribute for John's link to the computers topic at 0 (visible to John only).

Bill and John are friends, so Bill is able to view John's links such as the PC club link which John has made available to his friends. Lisa, however, is not as closely related to John. As shown in FIG. 9, Lisa is a friend-of-friend with respect to John. Lisa's view of John's links is shown in screen 136 of FIG. 27. In screen region 128 of screen 136, only the Bill icon is displayed. John's link to Bill is visible to Lisa, because John's link to Bill has a privacy setting of 3 (visible to all members of the service, including Lisa). The PC club icon is not displayed for Lisa in region 128 because John's link to the PC club was assigned a privacy setting of 1 (visible only to John and his friends such as Bill, not to John's friends of friends such as Lisa). The computers topic icon is not visible to Lisa either. John assigned a privacy setting of 0 to the computers topic link, so only John can view the computer topic link (see FIG. 25).

Figure 27:
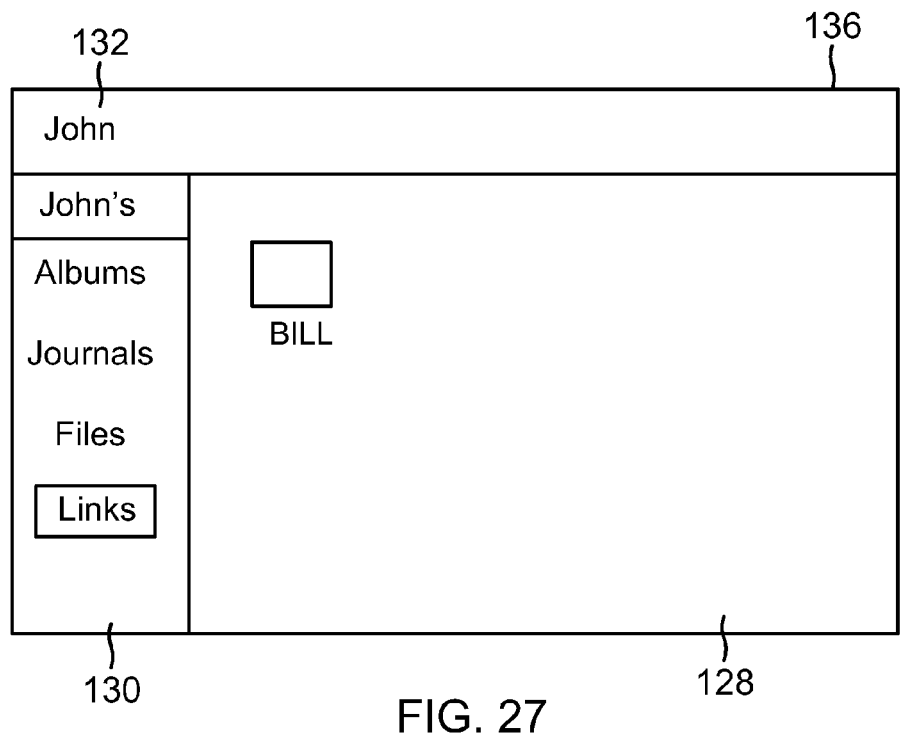
FIG. 27 is an illustrative screen that a client can display for a friend-of-friend of the given member when viewing the given member's linked members and topics in accordance with the present invention.

As the example of FIGS. 25-27 demonstrates, the ability of members to access the content of other members varies depending on the strengths of relevant relationships. Members that are remotely related to a given member can access less of that member's content than members that are closely related.

Figure 28:
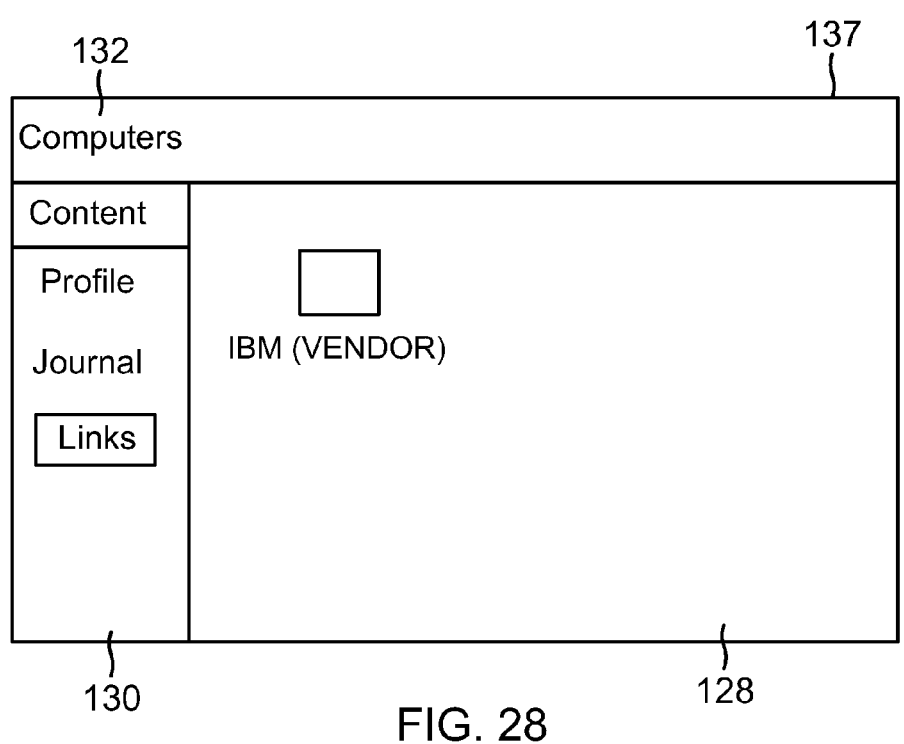
FIG. 28 is an illustrative client screen that may be displayed when the given member views a topic of interest in accordance with the present invention.

A screen 137 that may be displayed to John when John views the computers topic is shown in FIG. 28. The title of the topic being viewed is identified in region 132. Region 128 of screen 137 contains an icon for the IBM subtopic, because the privacy setting for the link 116 of FIG. 9 is 3 (visible to all members of the service, including John). In the example of FIG. 28, the IBM icon is labeled with the title of the object (IBM) and additional information ("vendor"). The additional information that is used to label the IBM icon in this example is a link descriptive attribute (i.e., the "vendor" attribute shown in the content column of row 14 of links table 84 of FIG. 8). In general, clients 32 may use any suitable descriptive attributes to label the member and topic icons that are displayed for the members.

Figure 29:
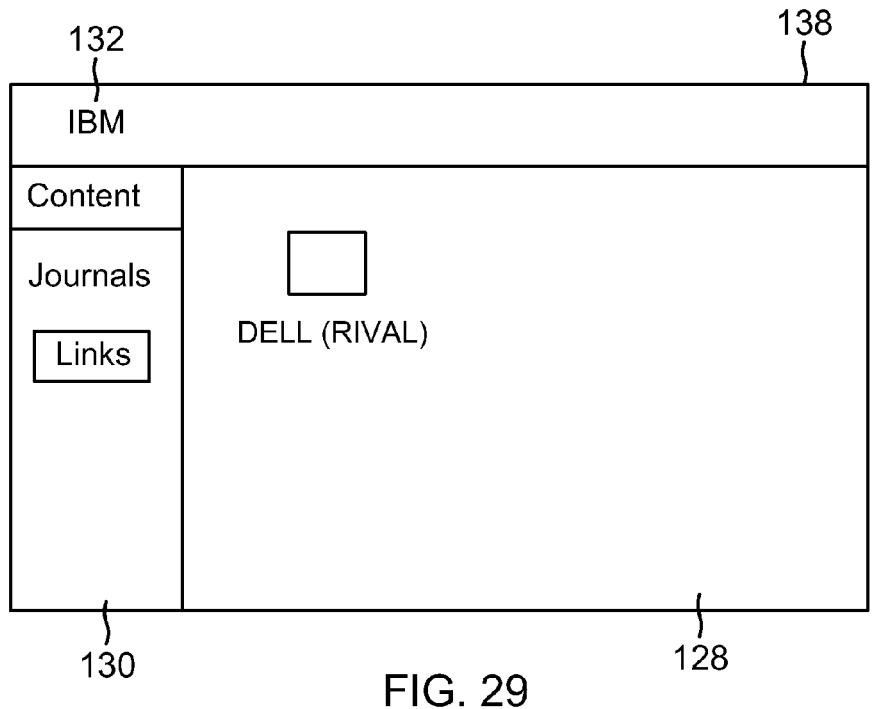
FIG. 29 is an illustrative client screen that may be displayed when the given member views a subtopic of the topic of interest of FIG. 28 in accordance with the present invention.

John may view details about the IBM topic by clicking on the IBM icon that is displayed in region 128 of FIG. 28. An illustrative screen 138 that may be displayed to John when John views the IBM topic by clicking on the IBM icon in FIG. 28 is shown in FIG. 29. Region 132 of FIG. 29 contains the title of the topic being viewed. Region 128 of FIG. 29 contains the links in the current topic that John is allowed to view. In this example, John is allowed to view the Dell link, because link 118 (FIG. 9) has a privacy setting of 3 (visible to all members of the service, including John). As the example of FIGS. 28 and 29 demonstrates, a member can browse through linked topics by clicking on icons of interest. During browsing, the links that the browsing member is allowed to view are displayed by the member's client. If privacy settings preclude access to certain topics and members, icons for those topics and members are hidden from view.

During use of the service, members can add links to members and topics of interest and can edit the descriptive attributes associated with members and topics. Local information on link associations and link descriptive attributes is stored in local links tables on member equipment and at supernode 14 as part of global links table 50.

The attributes associated with each member and topic object form member and topic profiles. A member profile includes attributes such as the member's name and member's age. These attributes are represented by member property links, as described in connection with the member property link for John in the first row of links table 84. Topic profiles include attributes such as the topic's title. An illustrative topic property link including a topic title is shown in the thirteenth row of the links table 84 for the topic "computers.". Topic and member creation and editing screens may be used to create and edit topic and member profiles.

Figure 30:
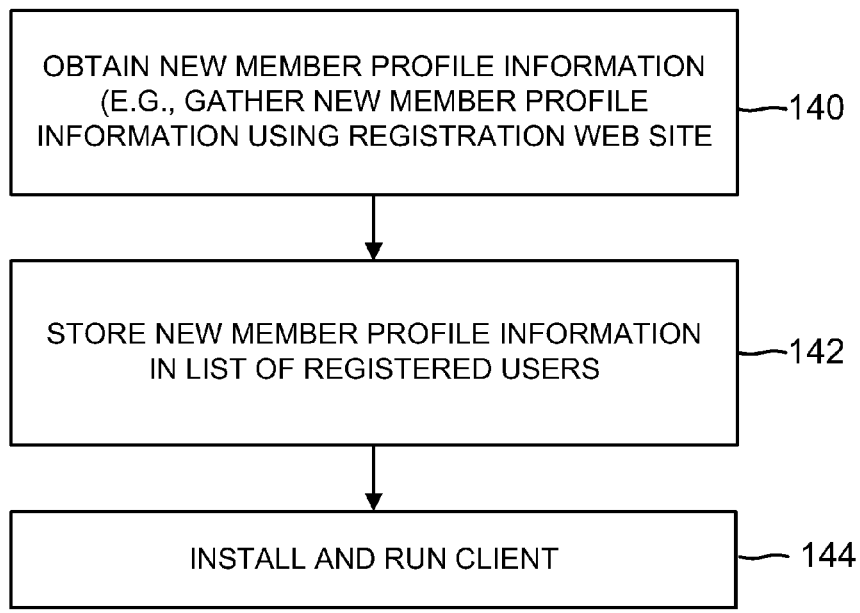
FIG. 30 is a flow chart of illustrative steps involved in creating a profile for a new member in the peer-based communications service in accordance with the present invention.

Illustrative steps involved in creating a new member account and a corresponding new profile for a member are shown in FIG. 30. At step 140, a user who is interested in joining the service visits a web site or other suitable online location to begin the process of registering as a member. The web site server or other suitable equipment associated with the service displays forms for the user that the user fills out. Information that the user provides to the service typically includes personal information such as name, hometown, age, gender, nickname, etc. The user or the service may choose a username and password for the user to use when logging in to the service. The information that is obtained by the service at step 140 is used to register the user as a member and to create a member profile for the user.

After obtaining the new member profile information at step 140, the new member profile information is stored by the service at step 142. The service may, for example, store the username and password information for the new member in a list of registered users such as list 48 at supernode 14 (FIG. 3). The supernode 14 may use this member profile information in evaluating members' credentials when they attempt to log in to the service. Any suitable format may be used to store the data in list 48. As one example, the member profile information in list 48 may be stored in a database table. Storing the new member profile information at the supernode completes the new member registration process. The new member can therefore install and run the client 32 on the new member's equipment 12 (step 144).

After a member has joined the service, the member uses client 32 to log into the service. During login operations, the member provides login credentials to the supernode (e.g., by entering a member ID and password into an on-screen dialog box). The supernode verifies the member's credentials and, if verification is successful, logs the member into the service.

After the member has logged into the service, the member can create topic profiles, edit topic and member profiles, and add and edit links to members and topics of interest.

Figure 31:
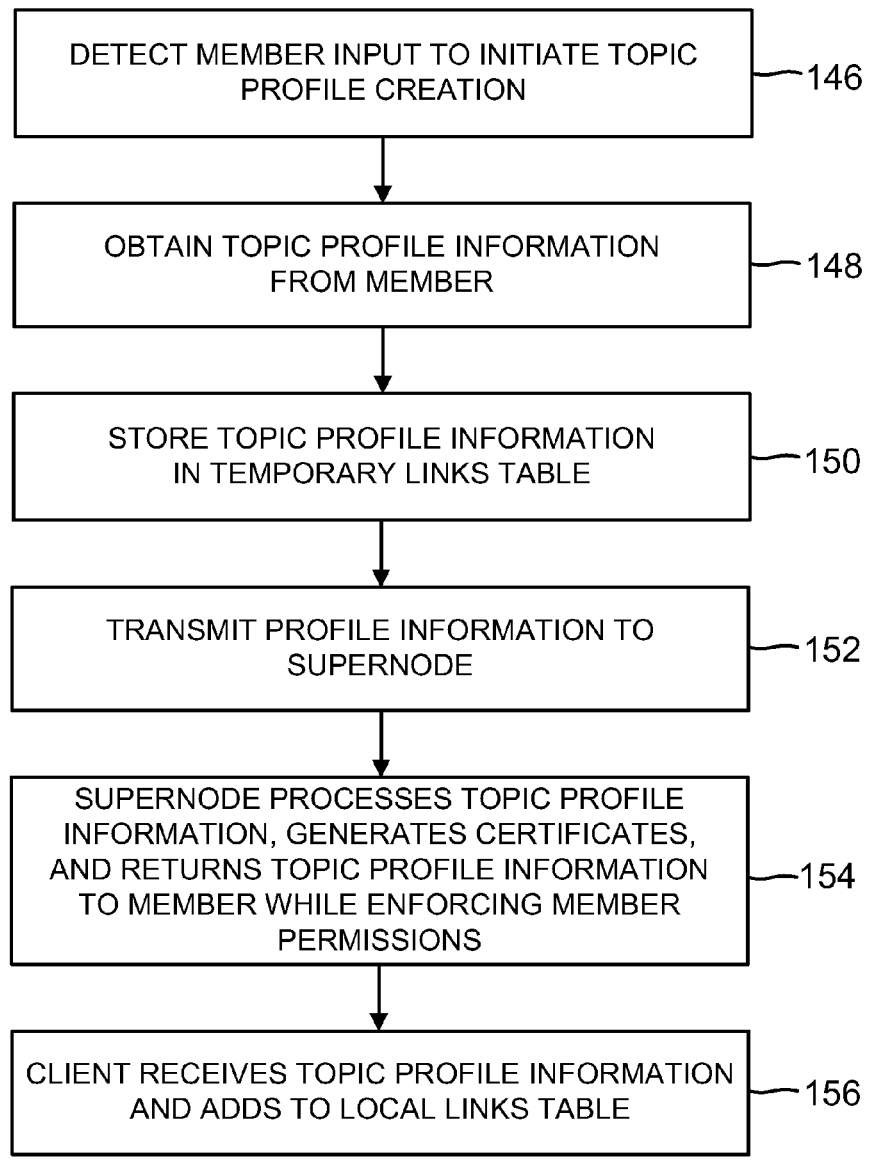
FIG. 31 is a flow chart of illustrative steps involved in creating a new topic for the peer-based communications service in accordance with the present invention.

FIG. 31 shows a flow chart of illustrative steps involved in creating a topic profile.

At step 146, the client running on the member's equipment detects input supplied by the member to initiate the topic profile creation process. The member can click on an on-screen option such as a create topic option or can otherwise input commands that direct the client to initiate the topic creation process.

Once the client has been directed to begin the topic creation process, the client can obtain topic profile information from the member at step 148. With one suitable arrangement, the client obtains information for the new topic profile by displaying a topic profile creation screen on the member's equipment 12. The member types in topic information into the profile screen and clicks on an on-screen button when data entry is complete.

At step 150, after gathering the topic profile information from the member, the client stores the gathered topic profile information in a temporary links table. For example, the title of the topic profile can be stored as a property link in one row of the temporary links table.

At step 152, the client transmits the new topic profile information to the supernode over the network.

At step 154, the supernode receives and processes the transmitted topic profile information. During processing, the supernode can create authenticity certificates. These certificates can be used to enhance the security of the service (e.g., by preventing attackers from fraudulently introducing data into the system). In a preferred implementation of the service, the supernode generates and stores a separate certificate in each new links table row. The topic profile information (including the newly generated certificates) is then returned to the member).

In returning the topic profile information to the member at step 154, the supernode enforces member permissions. In particular, the supernode will only return topic profile information to the member if the member is permitted to create that topic profile information. If a member is not permitted to create a given topic profile entry, the supernode will not return the prohibited topic profile entry to the member.

At step 156, the member's client receives the topic profile information from the supernode and stores this information in the member's local links table 40 (FIG. 2). Each newly added row in the links table contains a certificate that can be used in subsequent link verification operations.

Figure 32:
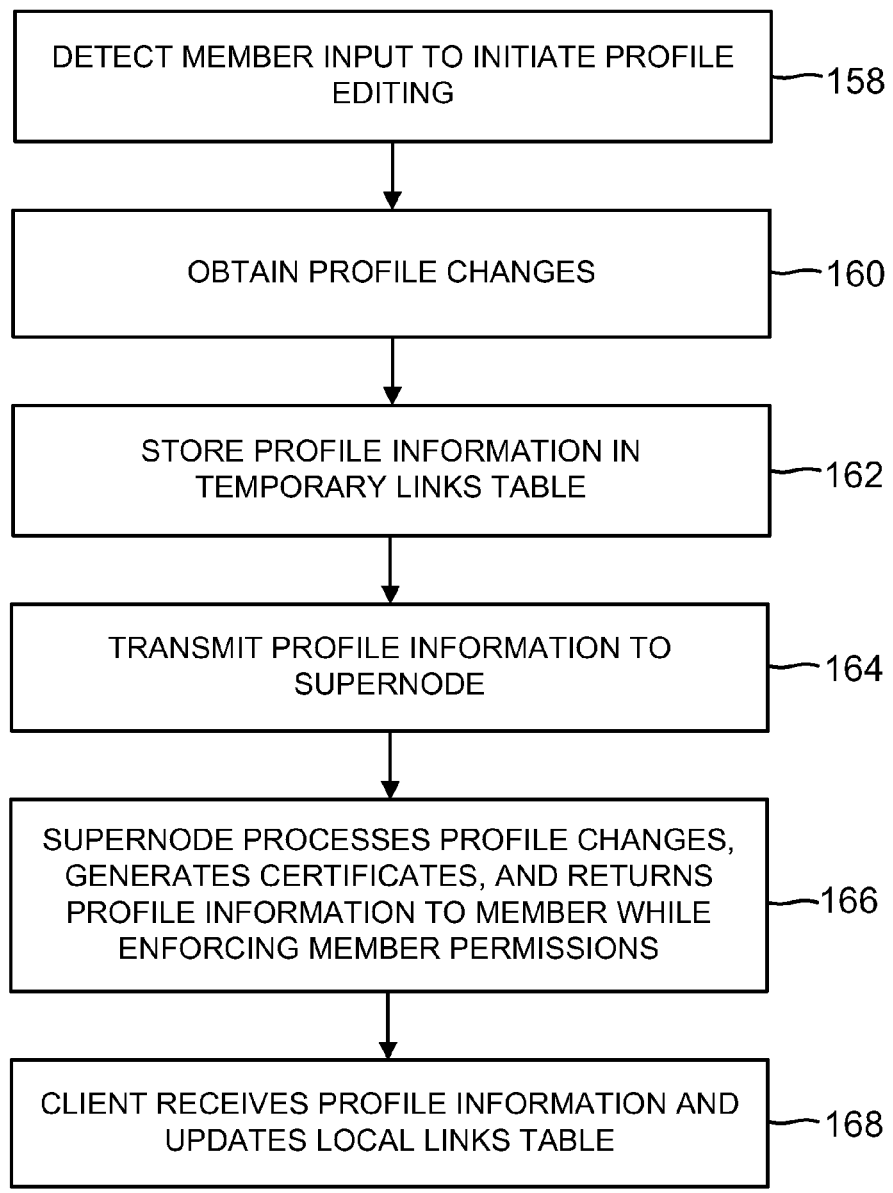
FIG. 32 is a flow chart of illustrative steps involved in editing an existing member or topic profile in the peer-based communications service in accordance with the present invention.

After member and topic profiles have been created, they can be edited. Illustrative steps involved in editing a member or topic profile are shown in FIG. 32.

At step 158, a member's client detects that the member has initiated profile editing activities. Any suitable user interface arrangement may be used to initiate the editing of a member or topic profile. For example, member can click on an edit topic or edit member button or may right click on a topic icon displayed by the client.

After the client has detected the initiation of profile editing at step 158, the client obtains profile changes at step 160. Any suitable arrangement may be used to obtain profile change information. For example, the client can present interactive topic profile edit screens and member profile edit screens to the member. The member can make desired changes by typing over existing entries, by clicking on on-screen-options, etc.

The desired profile changes that are obtained at step 160 are stored in a temporary links table at step 162.

At step 164, the profile changes are transmitted to the supernode by the client. The supernode receives and processes the changes at step 166. Each profile edit results in a new links table row. During processing, the supernode generates a certificate for each modified links table row and adds the certificate to the authenticity column of the row. After certificates have been added to the links, the profile information is returned to the member. During this process, the supernode enforces member permissions. For example, if the supernode will not allow one member to adjust another member's profile. If the supernode detects an attempt to adjust the member profile information associated with another member, that attempted changes will not be permitted. If the supernode determines that a member is adjusting their own profile, the change will be permitted and the changed link (with its certificate) will be returned to the member's client.

At step 168, the member's client receives the updated profile information from the supernode (e.g., the new links table rows). The client then updates the member's local links table 40 with the new rows.

Figure 33:
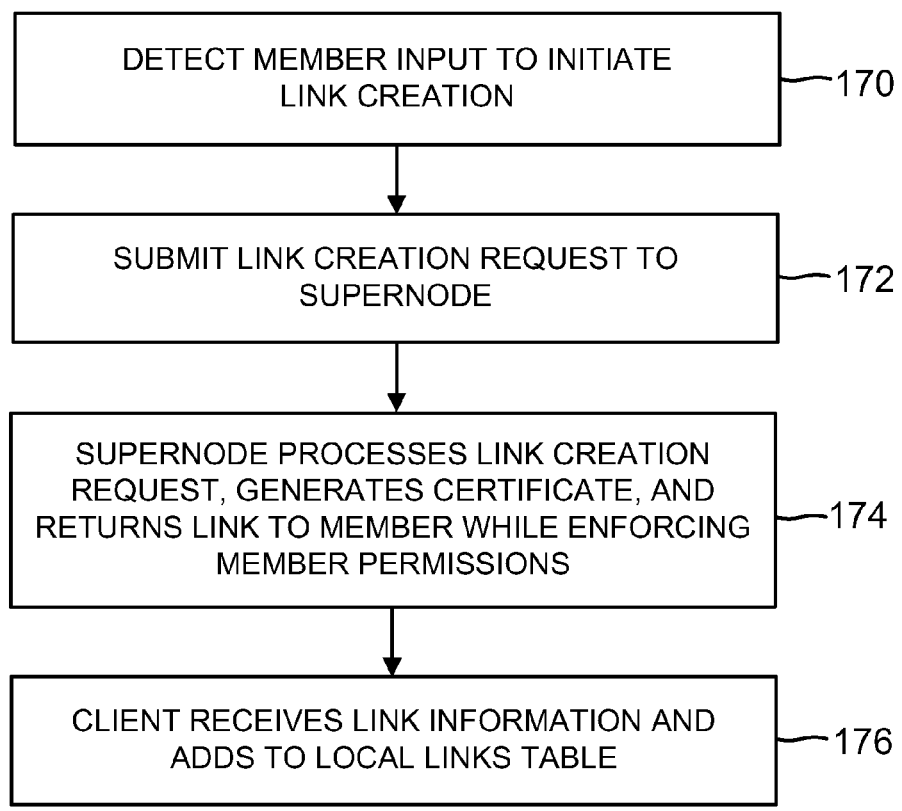
FIG. 33 is a flow chart of illustrative steps involved in creating linking relationships between members and topics in the peer-based communications service in accordance with the present invention.
Figure 34:
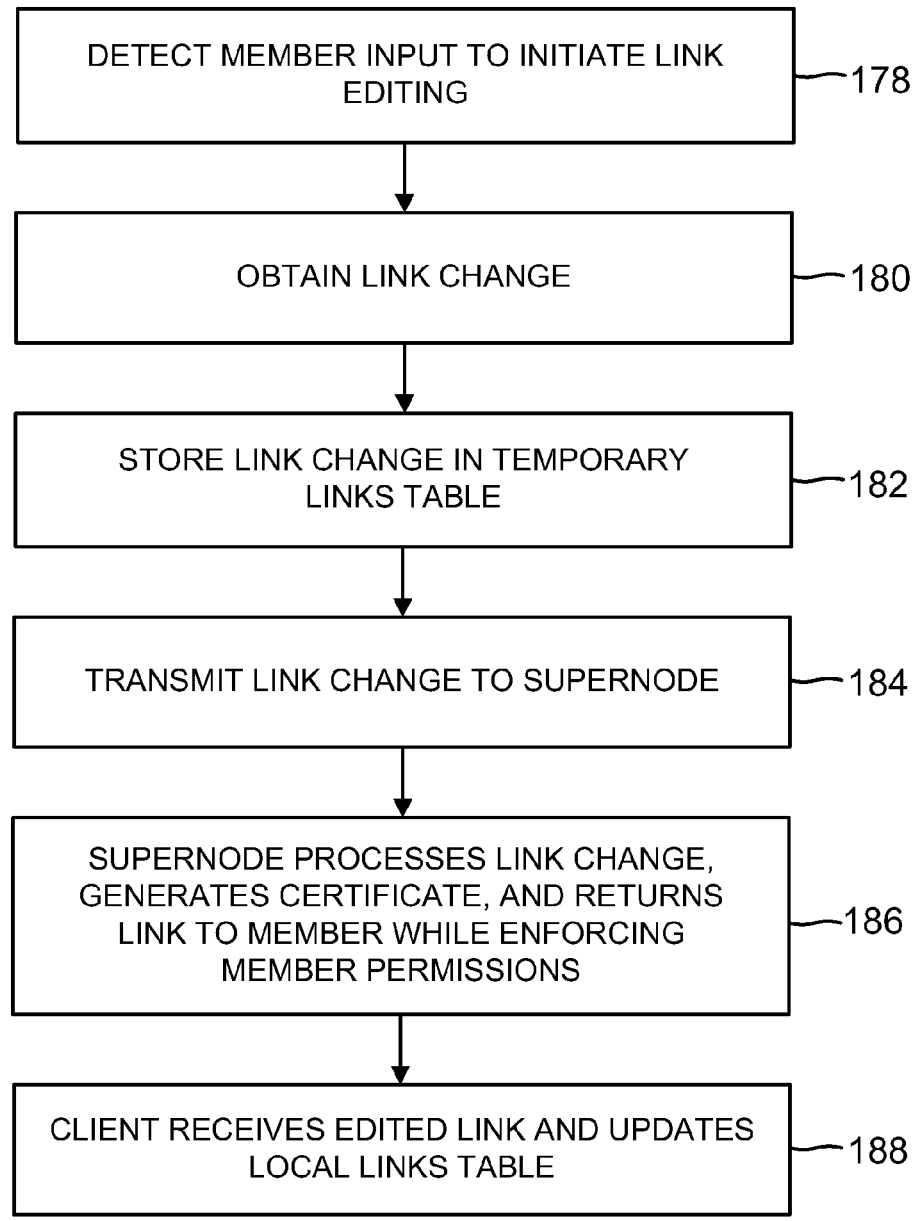
FIG. 34 is a flow chart of illustrative steps involved in editing object links representing linking relationships between topics and members in the peer-based communications service in accordance with the present invention.

During member and topic profile creation and editing operations, property links are created and edited for the member and topic objects in the system. Illustrative steps involved in the formation and editing of object links between members and topics are shown in FIGS. 33 and 34. FIG. 33 shows steps involved in creating object links. FIG. 34 shows steps involved in editing object links.

At step 170 of FIG. 33, a member's client detects member input that has been made to initiate the link creation process. Link creation may be initiated by right clicking on a member or topic icon and selecting an options such as "add link."

At step 172, in response to the member's selection of the link creation option, the client submits a link creation request to the supernode. The link creation request includes information identifying the desired new link.

The supernode receives and processes the link creation request at step 174. During processing, the supernode generates a certificate based on the new link information and inserts the certificate in the authenticity column of the link. The supernode also enforces member permissions. The supernode returns the link containing the certificate to the member at step 174, provided that the member is allowed to create the desired link. If the supernode determines that the link is impermissible (e.g., because a member is trying to link two other members together), the supernode will not return the link to the member.

At step 176, the member's client receives the new link and adds the new link to the local links table 40.

The link editing process is illustrated in FIG. 34. At step 178, the client detects when a member has initiated link editing operations (e.g., by right clicking on an icon and selecting an appropriate option, by clicking on an on-screen button, etc.).

At step 180, the link change that the member desires to make is obtained by the client.

At step 182, the link change to be made is stored in a temporary links table on equipment 12 by the client 32.

At step 184, the client 32 transmits the link change that is desired to the supernode 14 over the network.

At step 186, the supernode processes the link change request. In particular, the supernode generates a certificate for the edited link and inserts the certificate in the authenticity column of the edited link. The supernode also determines whether or not the member making the link change is authorized to edit the link. If, for example, the link is between two members other than the member making the link change request, the supernode will not allow the member to make the desired link change. If, however, the link change is valid, the supernode will return the changed link including the certificate for that link to the member's client.

At step 188, the client receives the edited link and updates the local links table 40 with the edited link information.

Figure 35:
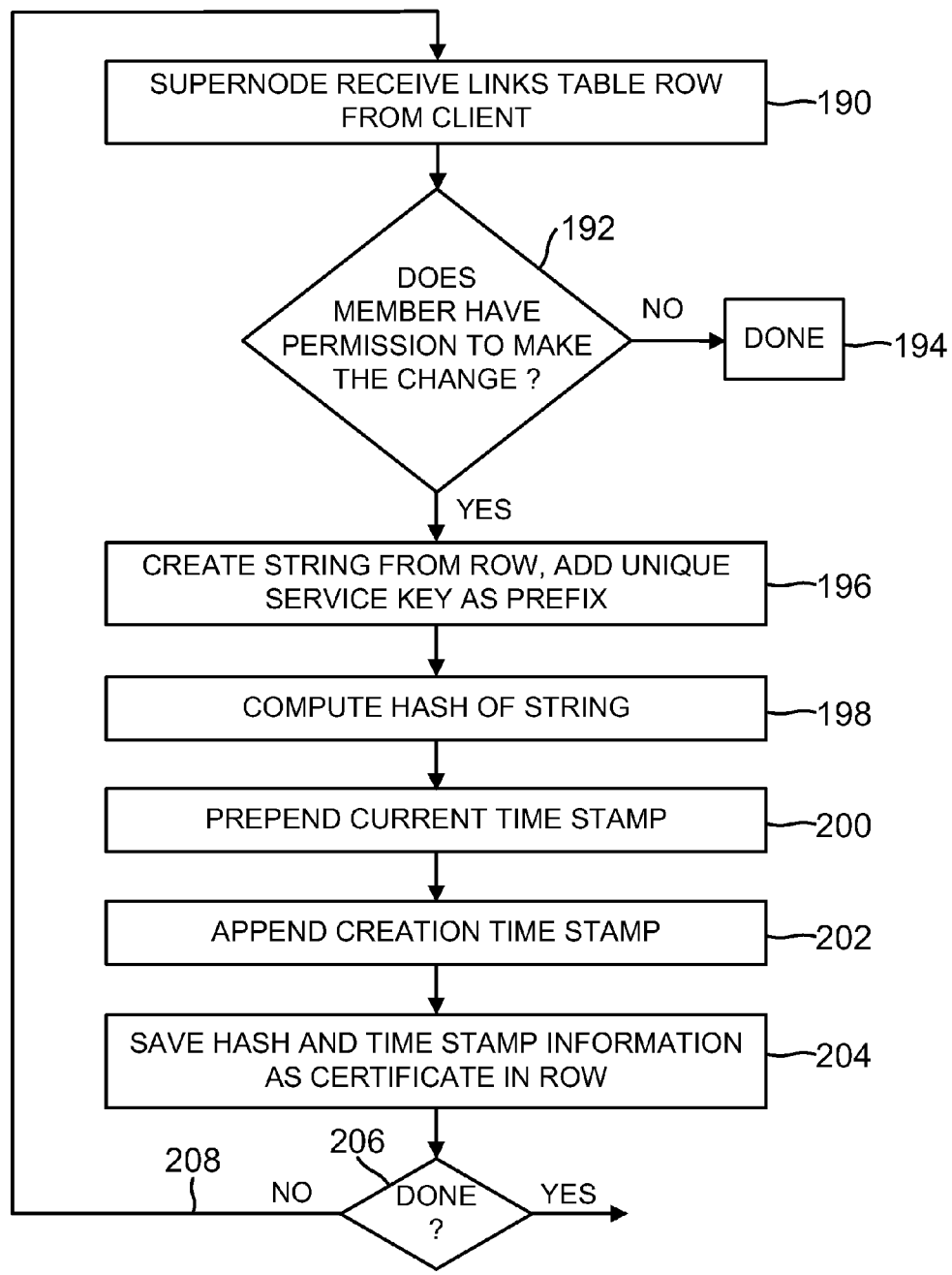
FIG. 35 is a flow chart of illustrative steps involved in using a server associated with the peer-based communications service in generating authenticity certificates for links table rows and in using the server to store the certificates in the links table rows in accordance the present invention.

FIG. 35 shows illustrative steps involved in certifying link content.

At step 190, the supernode receives a links table row to be certified. The row may be a new member profile row that was created during the process of FIG. 30 or may be a link row transmitted to the supernode from the client 32 during a step such as step 152 of FIG. 31, step 164 of FIG. 32, step 172 of FIG. 33, or step 184 of FIG. 34. The row may include, for example, a less restrictive privacy setting than was previously used.

At step 192, the supernode 14 determines whether the member from whose client the link is being submitted has permission to make the desired change. If, for example, the member is attempting to change a privacy setting or other portion of a link that another member created, the supernode will not permit the change and further processing of the link will not take place (step 194). If, however, a member is changing the privacy setting associated with a link that the member created, the supernode will allow the change to be made. Processing therefore continues at step 196.

At step 196, the supernode converts the information in the row (other than the content of the authenticity column) into a string. Converting the association information and descriptive attribute information in the link into a string facilitates subsequent hash function operations. During step 196, the supernode prepends a unique key associated with the service to the string. The unique service key may be, for example, a predefined pseudorandom alphanumeric string.

At step 198, the supernode uses a hash function to compute a hash of the string (including the service key).

At step 200, the supernode prepends a current timestamp to the hash value. The current timestamp represents the current time.

At step 202, the supernode appends a creation timestamp to the supernode, which indicates when the link was created. The hash created at step 198 and the timestamp information added at steps 200 and 202 form an authenticity certificate (sometimes referred to simply as a "certificate" herein) for the link. At step 204, the supernode saves the certificate in the row (e.g., in the authenticity column when a links table format of the type shown in FIG. 7 is used in the system).

Test 206 is used to determine if processing is complete. If it is determined that a certificate is to be generated for another row, control loops back to step 190, as shown by line 208.

Because the supernode certifies link content, a member's client at one peer node can ask the supernode to ascertain whether content that has been received from another peer node is authentic. If desired, peers can also generate certificates and verify certificates among themselves without involving the supernode.

Figure 36:
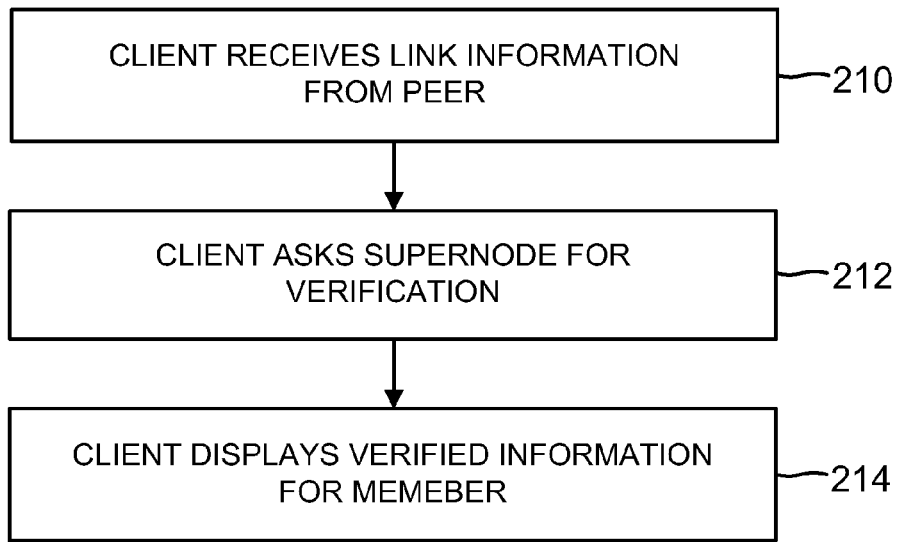
FIG. 36 is a flow chart of illustrative steps involved when a client requests verification of links table information using a certificate in accordance with the present invention.

Illustrative steps involved in using the supernode to verify content are shown in FIG. 36. The operations of FIG. 36 take place as a member is navigating through content in the service (e.g., by clicking on icons to browse to members and topics of interest).

At step 210, the member's client receives link information from another peer node. The link information may be, for example, information on a friend's links that is stored in that friend's local links table. Because the information is obtained in a peer-to-peer fashion, the supernode has not yet had an opportunity to vouch for its authenticity. The links information from the peer node might therefore be fraudulent information that is being provided to the member by a malicious entity (either a member or non-member). To avoid being spoofed in this way, the member's client can ask the supernode to verify the certificate in the link obtained from the peer (step 212).

In formulating a verification request, the client may transmit the contents of the link including the certificate in the link to the supernode. If the supernode determines that the link is valid, the client can display the link information to the member at step 214. For example, if a topic link is determined to be valid, an icon corresponding to the verified link can be displayed in the member's peer-based browser.

Figure 37:
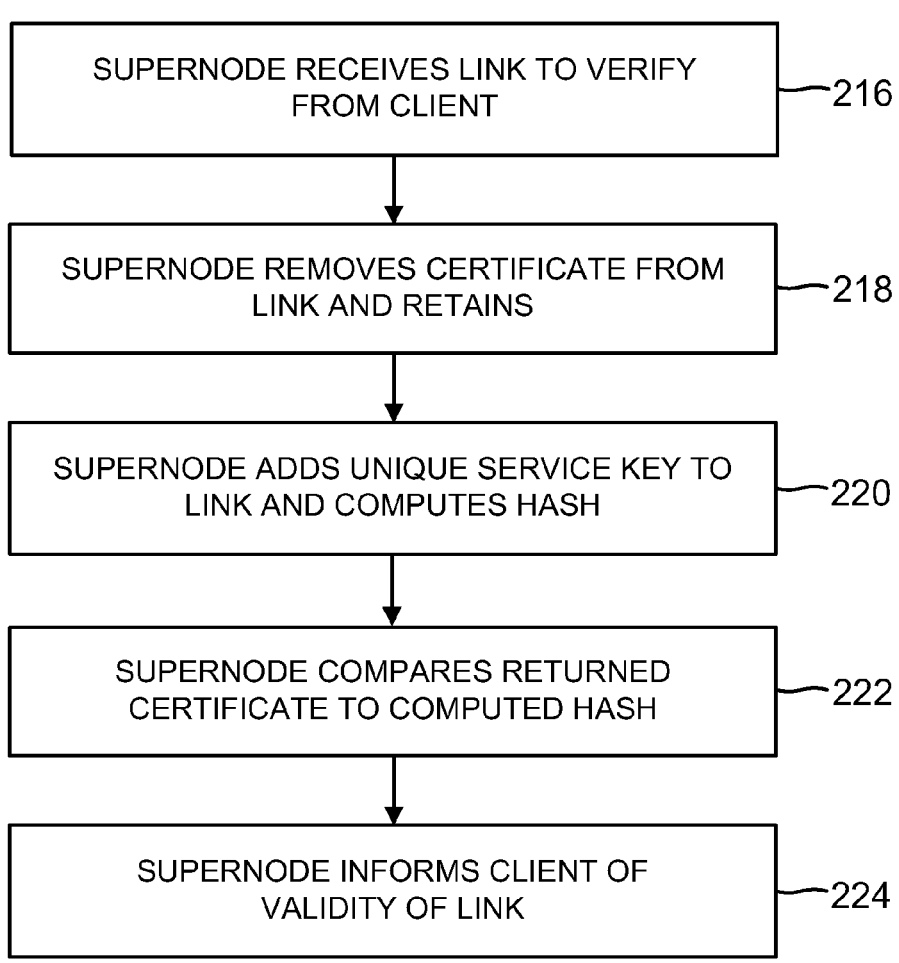
FIG. 37 is a flow chart of illustrative steps involved in verifying a links table row using an authenticity certificate in accordance with the present invention.

Illustrative steps involved in verifying a certificate at the supernode in response to a verification request from a client are shown in FIG. 37. At step 216, the supernode receives the link that is to be verified from the client.

At step 218, the supernode removes the certificate from the link and retains the certificate. Following certificate removal, the link contains only association information and descriptive attributes other than the authenticity (certificate) attribute.

At step 220, the supernode converts the link to a string, adds the unique service key to the link and, using the same hash function that was used at step 198 of FIG. 35, computes the hash of the link. Only the supernode has access to the unique service key. Because it is not possible for anyone other than the entity in possession of the unique service key to compute an acceptable hash value, the hash function computation may be used to check the authenticity of the certificate.

At step 222, the supernode compares the newly-computed hash to the hash function portion of the retained certificate from the client. If the hash and certificate match, the supernode can conclude that the link has not been tampered with. At step 224, the supernode informs the client of the results of the comparison.

Figure 38:
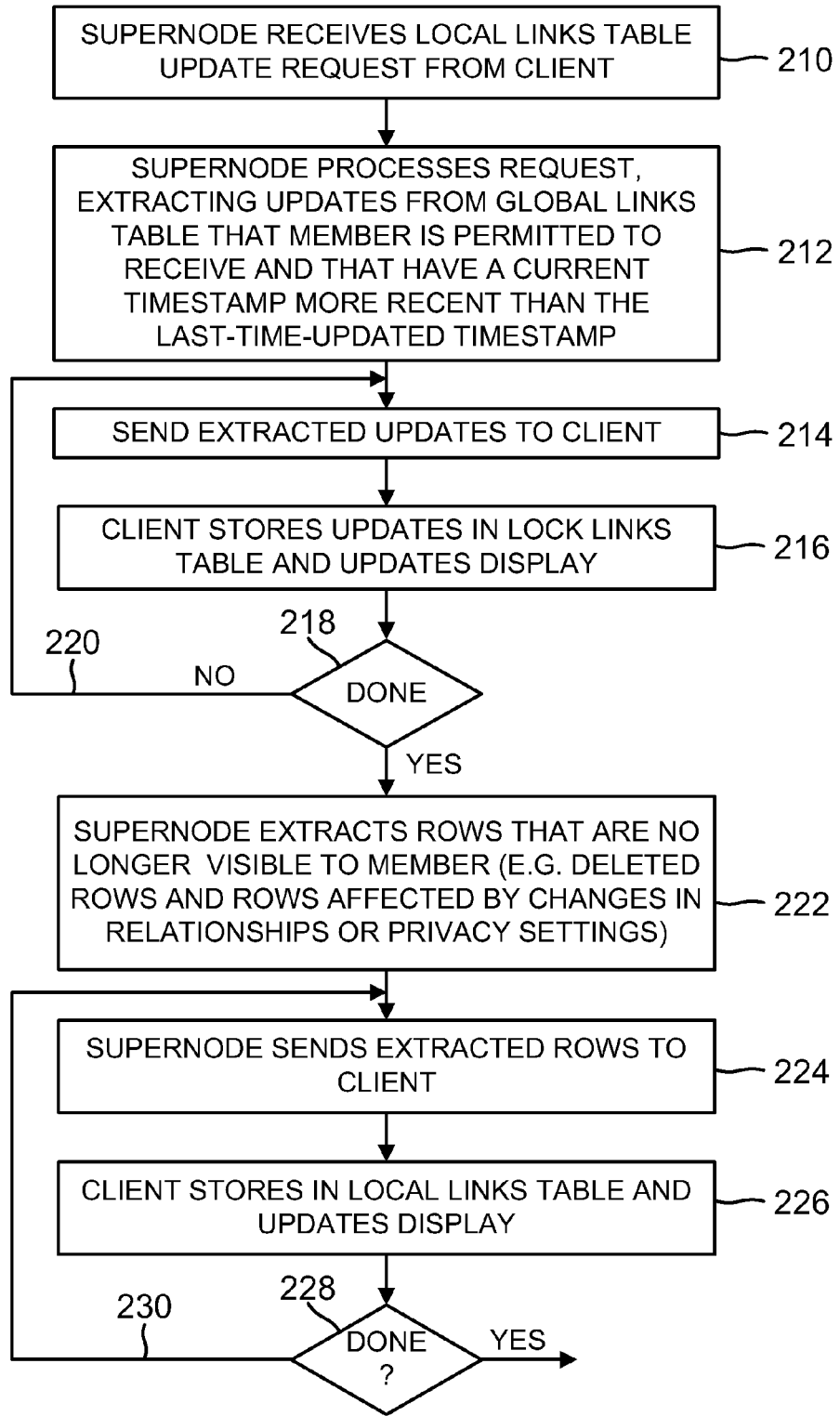
FIG. 38 is a flow chart of illustrative steps involved in synchronizing server and client content in the peer-based communications service in accordance with the present invention.

FIG. 38 shows operations involved in synchronizing client and supernode data. Synchronization operations may be performed when a member logs into the service, when the member makes a change that affects privacy settings, or at any other suitable time.

At step 210, the supernode receives a links table update request from the member's client. The update request includes last-time-updated timestamp information indicating the last time the member's client was updated.

At step 212, the supernode processes the update request. In processing the request, the supernode extracts updates from the global links table 50 (FIG. 3). The extracted links are limited to those that the member has suitable permission to receive. In evaluating whether the member is permitted to receive various link updates, the supernode enforces the privacy settings in the links table. For example, if a member is allowed to view a friend's links because the friend has set those links to be viewable by the member's friends (i.e., the links have a privacy setting of at least 1), these links will not be eliminated from the links extracted from the global database during the extraction process of step 212. If, however, a member is not allowed to view a friend's links because those links have been made private by the friend (e.g., a privacy setting of 0), these links will not be extracted for the member. To avoid needlessly extracting old information, the supernode preferably extracts only those links that have a current timestamp (or time-created timestamp) that is more recent than the last-time-updated timestamp.

At step 214, the extracted links are sent to the requesting client over the network.

At step 216, the client stores the updates in the local links table 40. The client also preferably refreshes the information being displayed to the member on the member's display to make it current.

If test 218 indicates that additional extracts are to be transmitted to the client, processing loops back to step 214, as shown by line 220. Otherwise processing continues at step 222.

At step 222, the supernode extracts link rows that are no longer visible to the member (e.g., deleted rows and rows affected by changes in relationships or privacy settings). If, for example, a friend has deleted a link that would otherwise be visible to the member, the supernode will extract this deleted row from the global links table. Deleted rows have privacy settings of −1. Changes in relationships between members may also cause certain rows to no longer be visible. For example, if a friend removes a friendship link, content that this friend only makes available to friends (e.g., content with a privacy setting of 1) will no longer be available to the member.

At step 224, the supernode sends the extracted rows that are no longer visible to the member to the member's client.

At step 226, the client receives the extracted no-longer-visible rows from the supernode and stores them in the local links table. The client may also update the member's current display screen by removing the icons that are no longer accessible to the member.

If test 228 indicates that further processing is required, processing loops back to step 224, as indicated by line 230. Otherwise the link synchronization operations associated with the link update request are done.

Figure 39:
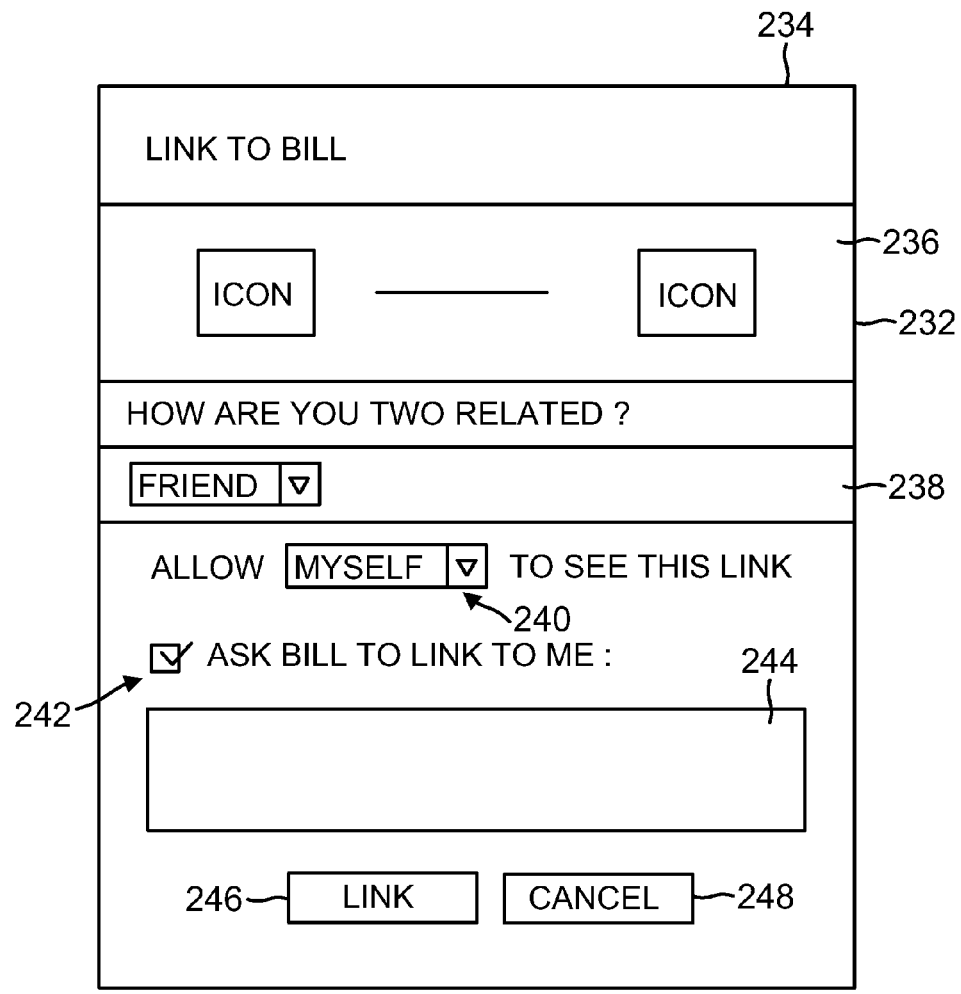
FIG. 39 is an illustrative screen that may be displayed by a member's client in the peer-based communications service when creating a link to another member in accordance with the present invention.

Any suitable arrangement may be used by the service to allow members to form links with each other and topics of interest. FIG. 39 shows an illustrative screen 232 that may be displayed to one member (e.g., John) by John's client 32 to allow John to begin establishing a bidirectional friendship link with another member (e.g., Bill).

Region 234 is used to list the member's name for the member to which John is linking. In this example, region 234 indicates the John is establishing a link to Bill.

Region 236 is used to display icons or other information that visually depicts the two members (e.g., John and Bill) who are being linked.

Option 238 allows John to define what type of relationship exists between John and Bill. Suitable choices that client 32 may present to John include "friend," "family," "work colleague," etc. Although option 238 uses a drop-down menu arrangement in the example of FIG. 39, this is merely illustrative. Any suitable arrangement may be used if desired. The choice made by John using option 238 may be stored in the content column of the links table row corresponding to the John to Bill link.

Visibility/privacy option 240 allows member John to assign a privacy attribute value to the John to Bill link. John may choose to make the John to Bill link visible only to himself by choosing "myself" (a privacy attribute of 0). Other visibility levels available to John include "friends" (privacy setting 1), "friends-of-friends" (privacy setting 2), "service members" (privacy setting 3), and "the public" (privacy setting 4). The privacy setting selected for the link is stored in the privacy attribute column of the John-to-Bill row in the links table.

Option 242 may be used to gather information from John on whether or not John wants to ask Bill to create a backlink to John. If the box of option 242 is not checked, the link created will be unidirectional (e.g., from John to Bill only in this example). If the box of option 242 is checked, Bill's client will present Bill with a corresponding link creation screen that asks Bill to create a link to John. Bill may use this screen to create the Bill-to-John link and to assign a privacy setting and relationship type to the Bill-to-John link.

Region 244 may be used by John to enter a text message for Bill. John may, for example, check box 242 and type the message "Do you want to link to me?" into region 244. The message of region 244 may be presented to Bill by Bill's client 32.

When John has finished adjusting the options of screen 232, John may select link option 246 to direct client 32 to begin the linking process. The link creation process may be cancelled by selecting option 248.

Figure 40:
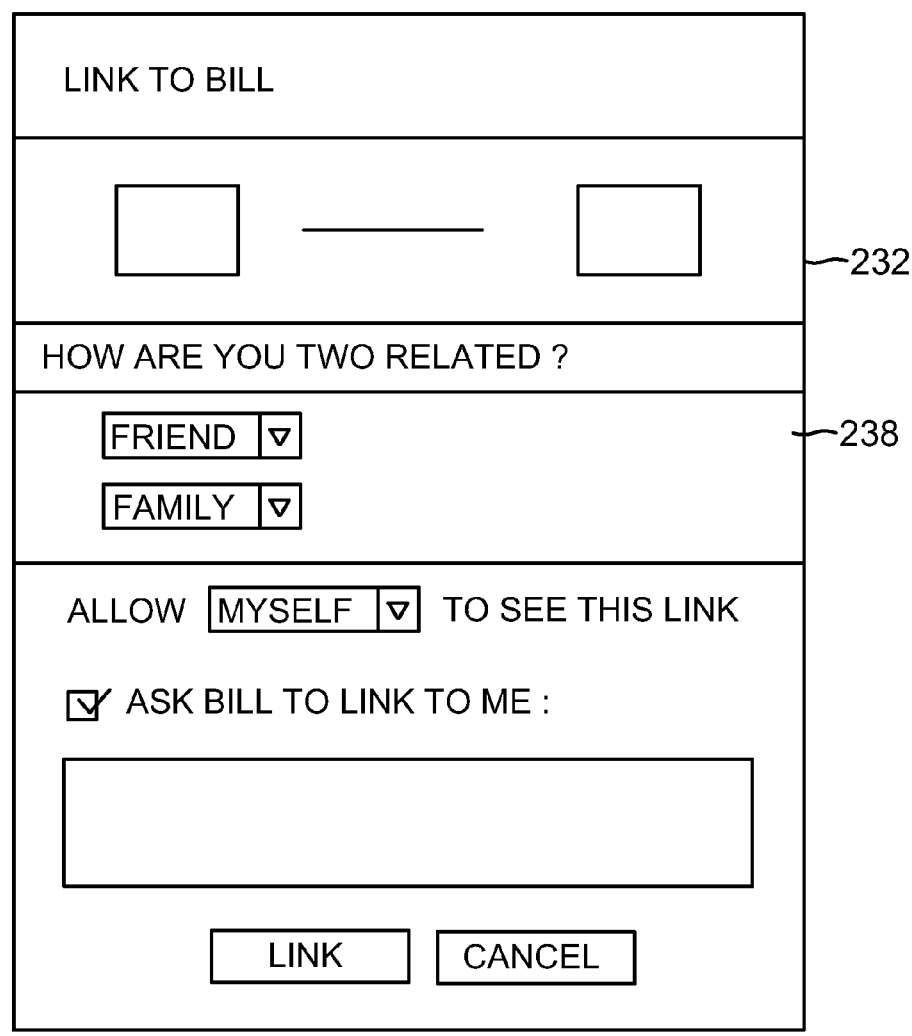
FIG. 40 is another illustrative screen that may be displayed by a member's client in the peer-based communications service when creating a link to another member in accordance with the present invention.

Another illustrative format for the link creation screen 232 is shown in FIG. 40. As shown in FIG. 40, region 238 may contain multiple relationship options. This type of arrangement may be used to allow a member to assign more than one type of relationship to a link. For example, if John and Bill are related both by work and family ties, John can use the options of region 238 to assign "family" and "work colleague" settings to the John to Bill link.

Figure 41:
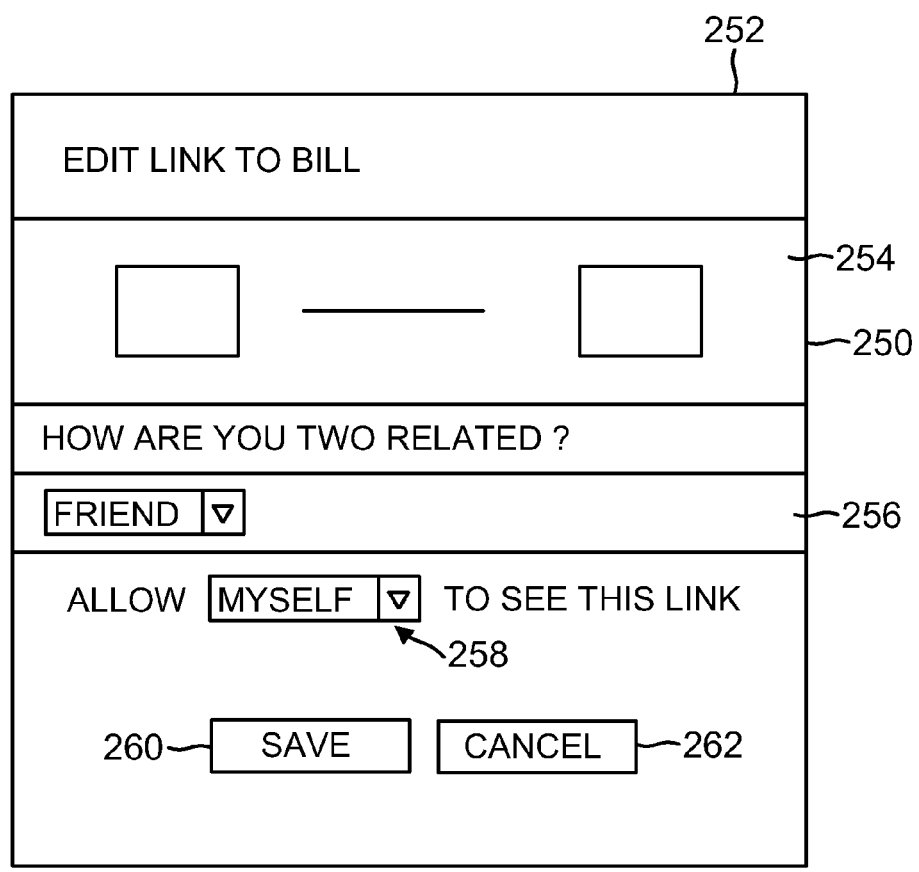
FIG. 41 is an illustrative screen that may be displayed by a member's client in the peer-based communications service when editing a link with another member in accordance with the present invention.

An example of a screen that client 32 may present to John to edit the John-to-Bill link is shown in FIG. 41. Region 252 of screen 250 identifies the link being edited. In this example, the link being edited is John's link to Bill. Region 254 contains a visual depiction of the link being edited. Region 254 may, for example, contain icons for the two members associated with the link (e.g., John and Bill).

The relationship option of region 256 is used to assign a relationship type to the John to Bill link. John may use this option to change the type of relationship between John and Bill. For example, John can change the relationship from "work colleague" to "friend" using the drop-down menu of region 256.

Option 258 may be used to adjust the privacy setting for the link. For example, John may initially have set up the link to Bill to be visible only to service members who are at least friends of friends of John. John may use option 258 to make the John to Bill link more widely visible (e.g., by setting the link visibility setting to 3 to make the link visible to all service members).

After making desired adjustments to the link settings, John may click on save option 260. The link setting adjustments that John made are then saved in the links table. If John does not want to save any link changes, John may click on cancel option 262 to direct the client 32 to cancel the link edit process.

The link creation and editing screens of FIGS. 39, 40, and 41 may be displayed as pop-up windows that appear over other screens displayed on member equipment 12, may be displayed as full screens, or may be displayed using any other suitable arrangement. Moreover, the options shown in these screens are merely illustrative. Any other suitable format may be used for displaying these options such as drop-down menus, clickable buttons, options available through right-clicking on an on-screen item, etc.

FIGS. 42-47 show the types of behaviors that are associated with different types of objects in the service.

Figure 42:
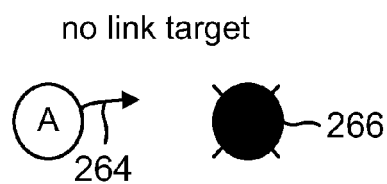
FIG. 42 is a graph showing how the service can capture errors when a member attempts to create a link to an unavailable object in accordance with the present invention.

FIG. 42 shows how requests made to link to non-existent objects will cause errors that are captured by the service. If, for example, John at object A attempts to form a link 264 by right clicking on an icon corresponding to a deleted topic 266, the service can present John with an error message informing John that the desired topic is no longer available.

Figure 43:
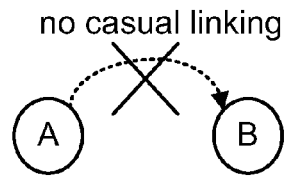
FIG. 43 is a graph showing how certain objects in the peer-based communications service do not freely permit linking from members in accordance with the present invention.

FIG. 43 shows how it may not be possible to freely establish a link to certain objects (e.g., from object A to object B). An example of this type of situation is a topic object B for a club with a limited number of participants. Once the maximum number of allowable participants has been reached, the service will not allow additional links to the topic object B to be created. Members' clients can inform them when attempts to link to the topic object fail. For example, a client 32 can display the message "group full" to indicate to a member that it is no longer possible to link to the topic.

Figure 44:
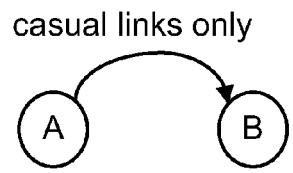
FIG. 44 is a graph showing how certain objects in the peer-based communications service allow casual links from members in the service in accordance with the present invention.

Some objects may only accept unidirectional links, as shown in FIG. 44. For example, the service may contain a member object associated with a famous musician or other celebrity. The celebrity may want to participate in the service, but may not want to form backlinks to any members of the service. The service will automatically reject all requests made to form backlinks (i.e., all friendship requests) to the famous musician member object. Most topic links in the service behave as illustrated in FIG. 44. A member A can freely form a link to a topic B, but cannot request that a backlink be formed from the topic B back to the member A.

Figure 45:
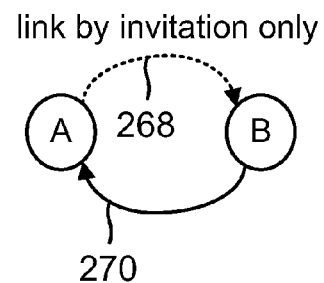
FIG. 45 is a graph showing how the peer-based communications service may contain some objects to which a member can create a link only if invited in accordance with the present invention.

The service supports private topics. This type of situation is illustrated in FIG. 45. When a topic is "by invitation only," members can only link to the topic if they receive an invitation. The invitation may be presented by an invited member's client 32 (e.g., as a pop-up screen). When the member responds affirmatively to the invitation, a link is formed. An example of an object that permits links by invitation only is an exclusive club represented by topic object B. It is not possible for member A to form a unidirectional link to topic B. Member A can only form link 268 from member A to topic B by creating a back link from A to B after the B to A link 270 has been formed.

Figure 46:
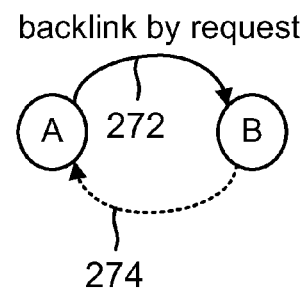
FIG. 46 is a graph showing how the peer-based communications service contains objects to which a backlink may be created for establishing a friendship relationship only if the backlink is requested by another member in accordance with the present invention.

The typical friendship request situation is shown in FIG. 46. In this situation, member A initially forms a unidirectional link 272 to member B. Member B is presented with a friendship request by member B's client 32. If B responds affirmatively to the friendship request, a backlink 274 is formed from member B to member A.

Figure 47:
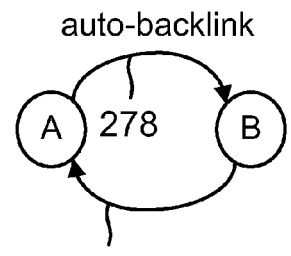
FIG. 47 is a graph showing how the peer-based communications service may automatically create backlinks from certain objects to requesting members in accordance with the present invention.

Backlinks can be formed automatically. As shown in FIG. 47, for example, backlink 276 may be formed automatically upon formation of forward link 278. In this type of situation, the service ensures that object B automatically accepts all friendship requests without displaying any dialog boxes for object B.

The information used to support the object behaviors and interactions described in connection with the examples of FIGS. 42-47 is stored in the links tables and is processed by the clients and the supernode. This information may be stored explicitly as attribute values and/or implicitly by using a links table value such as a object ID value that falls within a particular range. During operations such as displaying content to members with clients 32 and synchronizing clients 32 with supernode 14, the service uses the links table information to implement the functions of the service, observing restrictions on access (privacy), restrictions on linking, etc.

Figure 48:
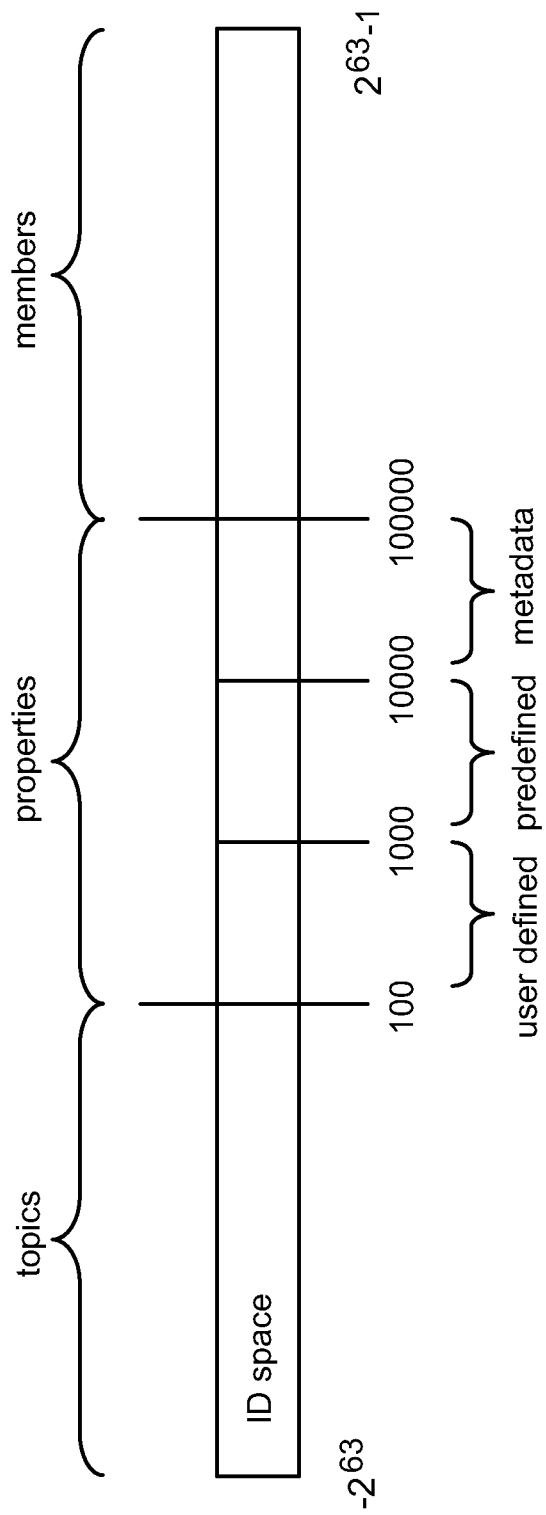
FIG. 48 is a diagram of an illustrative identifier space that may be used in the peer-based communications service in accordance with the present invention.

An illustrative ID space that may be used for the object ID values in the object ID and target ID columns of links table 84 (FIG. 8) is shown in FIG. 48. When the ID space of FIG. 48 is used, values greater than $-2^{63}$ and less than or equal to 100 are used by topics. For example, the target ID of 98 that is used in the link in the third row of table 84 in FIG. 8 corresponds to a topic object. Values greater than 100 and less than or equal to 100,000 are used by properties. For example, the first row of table 84 has a target ID of 10,000, which indicates that "John" is a property associated with member object 100,001. Values above 100,000 and less than or equal to $2^{63}-1$ are used by members. For example, the object ID 100,001 is associated with the member object for John in the first row of table 84 in FIG. 8.

Within the range of values reserved for properties, subranges of values may be used to convey additional information. For example, the properties range may be subdivided into a user-defined range ($100 < \text{value} \leq 1,000$), a predefined range ($1,000 < \text{value} \leq 10,000$), and a metadata range ($10,000 < \text{value} \leq 100,000$).

The user-defined range may be used for links that are associated with new types of data. For example, a member may create a user-defined "favorite color" field for a member profile and may populate this field with the value "blue." This information may be stored in a row in table 84 in which the object ID column contains the member ID and the target ID column contains a value in the user-defined range (indicating that the link is a property link of the user-defined type). The content attribute for this link may be "blue."

The predefined range may be used to classify items in the service such as common profile entries (e.g., name, age, gender, etc.). In the example of FIG. 8, the value 10,000 is used for all property links defining members' names. For example, the target ID for the first row of the table 84 is 10,000 because this property link corresponds to the name "John." The target ID for the fifth row is also 10,000, because the link for the fifth row corresponds to the name "Bill."

The metadata range may be used to identify items in the service that have other characteristics. For example, if it is desired to support a function in the service in which the content of former members is made available to members in the service, a metadata ID value may be associated with the member status of "alumni." If member John of the example of FIG. 8 were to leave the service, for example, the target ID in the first row of table 84 could be replaced with the value 10,002 (where 10,002 indicates that John is the name of a former member whose content is still available). The use of the metadata value 10,002 to represent the names of former members is merely illustrative. Any suitable values or subranges within the metadata range may be used to convey information that is used in providing features in the service. An advantage of conveying information in this way is that it allows features to be added to the service without changing the format of table 84.

The foregoing is merely illustrative of the principles of this invention and various modifications can be made by those skilled in the art without departing from the scope and spirit of the invention.

What is claimed is:

1. A method for supporting a peer-based communications service that has peer members at clients that communicate with each other over a network about topics, wherein the peer members and topics are represented by objects that have properties, comprising:
    maintaining information on links between the objects and the properties of the objects as links table rows, wherein each links table row contains a privacy setting, a linking association between two respective objects, and corresponding descriptive attributes, wherein each links table row's linking association includes at least two object identifiers identifying a first object at which a link begins and second object at which a link terminates, and wherein each links table row's descriptive attributes include attributes representing the relationship between the first object and the second object;
    searching the information using a distributed database search, wherein:
    the searching propagates from a client of an originating peer member to a second client of a second peer member;
    the originating peer member and the second peer member are within a peer network; and
    as the links table associated with the second peer member is searched, search results are returned to the originating peer member; and using the privacy settings to determine whether the originating peer member can display a link between objects.

2. The method defined in claim 1 further comprising:
    using the privacy settings to determine whether the given-originating peer member can view the property of a given object using originating peer member's client.

3. The method defined in claim 1 wherein each links table row contains a linking association portion having at least one object identifier and a descriptive attributes portion including the privacy setting for that links table row, the method further comprising using the linking association portions and the descriptive attributes portions to determine which links between objects and which object properties can be viewed using the originating peer member's client.

4. The method defined in claim 1 wherein the service includes a server with which the clients communicate over the network, the method further comprising:
    storing a global links table containing a plurality of the links table rows at the server;
    at each client, storing a respective local subset of the global links table, wherein the local subset of the global links table at each client contains information on links between objects and object properties that can be viewed by the member at that client.

5. The method defined in claim 1 wherein the service includes a server with which the clients communicate over the network, the method further comprising:
    storing a global links table containing a plurality of the links table rows at the server;
    at each client, storing a respective local subset of the global links table; and synchronizing the global links table and the respective local subsets of the global links table.

6. The method defined in claim 1 wherein the service includes a server with which the clients communicate over the network, the method further comprising:
    storing a global links table containing a plurality of the links table rows at the server;
    at each client, storing a respective local subset of the global links table; and using the privacy settings to enforce member permissions while synchronizing the global links table and the respective local subsets of the global links table.

7. The method defined in claim 1 further comprising using the clients to allow the peer members to create links table rows.

8. The method defined in claim 1 further comprising using the clients to allow the peer members to edit links table rows to change the privacy settings.

9. The method defined in claim 1 further comprising using the server to compute an authenticity certificate for each links table row.

10. The method defined in claim 1 wherein the links table rows indicate which peer members are linked to a given peer member as friends, which peer members are linked as friends of friends, and which peer members are linked more remotely than friends of friends, the method further comprising:
    using a friends-of-friends privacy setting in a given one of the links table rows to permit viewing of a given link using the clients of friends of the given peer member and using the clients of friends of friends of that given peer member and to prevent viewing of the given link by the clients of the peer members that are linked more remotely than friends of friends to the given peer member.

* * * * *